US010590516B2

(12) United States Patent
Liang et al.

(10) Patent No.: US 10,590,516 B2
(45) Date of Patent: Mar. 17, 2020

(54) ALLOY FOR CATALYTIC MEMBRANE REACTORS

(71) Applicant: Commonwealth Scientific and Industrial Research Organisation, Campbell, Australian Capital Territory (AU)

(72) Inventors: Daniel Dong Liang, Mt Waverley (AU); Michael David Dolan, Woodend (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 714 days.

(21) Appl. No.: 14/313,997

(22) Filed: Jun. 24, 2014

(65) Prior Publication Data

US 2015/0368762 A1 Dec. 24, 2015

(51) Int. Cl.
*C22C 27/02* (2006.01)
*C22F 1/18* (2006.01)
*C01B 3/50* (2006.01)
*B01D 71/02* (2006.01)
*B01D 53/22* (2006.01)
*B01J 23/44* (2006.01)
*B01J 23/648* (2006.01)
*B01J 35/06* (2006.01)

(52) U.S. Cl.
CPC .......... *C22C 27/025* (2013.01); *B01D 53/228* (2013.01); *B01D 71/022* (2013.01); *B01J 23/44* (2013.01); *B01J 23/6482* (2013.01); *B01J 35/065* (2013.01); *C01B 3/503* (2013.01); *C22F 1/18* (2013.01); *B01D 2256/16* (2013.01); *B01D 2257/304* (2013.01); *B01D 2257/502* (2013.01); *B01D 2257/504* (2013.01); *B01D 2257/7025* (2013.01); *B01D 2257/80* (2013.01); *C01B 2203/0283* (2013.01); *C01B 2203/041* (2013.01); *Y02C 10/10* (2013.01); *Y02C 20/20* (2013.01); *Y02P 20/152* (2015.11); *Y02P 20/156* (2015.11); *Y02P 30/30* (2015.11)

(58) Field of Classification Search
CPC ................ B01D 53/228; B01D 71/022; C01B 2203/0283; C01B 2203/041; C01B 3/503; C22C 27/025; C22F 1/18; B01J 23/6482
USPC ........................................................ 420/424
See application file for complete search history.

(56) References Cited

U.S. PATENT DOCUMENTS 6,607,693 B1 * 8/2003 Saito ....................... C22C 1/045
148/421
7,001,446 B2 * 2/2006 Roark .................. B01D 53/228
55/524

(Continued)

OTHER PUBLICATIONS

Nagasaka, T. et al. "Development of fabrication technology for low activation vanadium alloys as fusion blanket structural materials." 2006. Nuclear Fusion. 46. p. 618-625 (Year: 2006).*

(Continued)

*Primary Examiner* — Colleen P Dunn
*Assistant Examiner* — Nicholas A Wang
(74) *Attorney, Agent, or Firm* — John P. White; Cooper & Dunham LLP

(57) ABSTRACT

A vanadium alloy essentially consisting of: vanadium; and aluminium having a content of greater than 0 to 10 at %, and a process of producing thereof.

20 Claims, 23 Drawing Sheets
(12 of 23 Drawing Sheet(s) Filed in Color)

(56) References Cited

U.S. PATENT DOCUMENTS

2010/0247944 A1* 9/2010 Mleczko ............ B01D 67/0041
428/546
2013/0243660 A1* 9/2013 Kim .................... B01D 53/228
422/187

OTHER PUBLICATIONS

Satou, M. et al. "Improvement in post-irradiation ductility of neutron irradiated V—Ti—Cr—Si—Al—Y alloy and the role of interstitial impurities." 2000. Journal of Nuclear Materials. 283. p. 367-371. (Year: 2000).*

Magnone, E. et al. "High-performance boron-doped vanadium-aluminum alloy membranes for hydrogen separation." 2012. Materials Letters. 73. p. 47-49. (Year: 2012).*

Korinko, P.S. et al. "Development of non-noble metal hydrogen purification system." 2009. p. 1-8 (Year: 2009).*

Atkinson, H.V. et al. "Fundamental aspects of hot isostatic pressing: an overview." 2000. Metallurgical and materials transactions. 31A. p. 2981-3000 (Year: 2000).*

Kim K. H. et al. "Vanadium alloy membranes for high hydrogen permeability and suppressed hydrogen embrittlement." 2013. Scripta Materialia. 68. p. 905-908 (Year: 2013).*

Lu, G. Q. et al. "Inorganic membranes for hydrogen production and purification: A critical review and perspective." 2007. Journal of Colloid and interface science. 314. p. 589-603 (Year: 2007).*

"Recent trends in hot isostatic pressing HIP: processing and applications." 2012. Powder metallurgy review. vol. 1 No. 1 p. 23-29 Year: 2012).*

Dolan et al. (Jul. 10, 2013). The effect of Ti on hydrogen absorption and diffusivity in V—Ti—Al alloy membranes. *Journal of Membrane Science*, 446, 405-409.

Dolan et al. (Jun. 24, 2013). Hydrogen transport properties of several vanadium-based binary alloys, *International Journal of Hydrogen Energy*, 38, 9794-9799.

Dolan et al. (Oct. 21, 2013). Suppression of the critical temperature in binary vanadium hydrides. *Journal of Alloys and Compounds*, 586, 385-391.

Dolan et al. (Nov. 18, 2013). Alloy membrane reactor for pre-combustion CO2 capture. 10th Australian Coal Science Conference, Nov. 18-19, 2013, Brisbane, Queensland.

* cited by examiner

ALLOY FOR CATALYTIC MEMBRANE REACTORS

TECHNICAL FIELD

The present invention generally relates to an alloy for membrane reactors, a membrane formed from said alloy and a membrane reactor which includes said membrane and process for operating a catalytic membrane reactor including a membrane formed from said alloy. The invention is particularly applicable for separation of hydrogen from a gas stream, such as is produced in the water shift reaction and it will be convenient to hereinafter disclose the invention in relation to that exemplary application. However, it is to be appreciated that the invention is not limited to that application and could have wider application where selective hydrogen separation or absorption is required.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Capture of $CO_2$ emissions from coal-based energy systems is one means in which the greenhouse gas intensity of coal utilisation can be reduced. Capture can be performed post-combustion or pre-combustion, in which the energy content of coal-derived syngas is shifted via the water-gas-shift (WGS) reaction to $H_2$, followed by the separation and capture of $CO_2$ as shown in (1):

$$CO+H_2O \leftrightharpoons CO_2+H_2 \quad (1)$$

Membrane-based separation technology is currently under development for the separation of $H_2$ from mixed gas streams. Broadly speaking, a membrane is a near two-dimensional structure which is selectively permeable to one species. In the context of gas separation, a membrane allows one species to selectively permeate (usually $H_2$), while blocking other species (e.g. CO, $CO_2$, $H_2O$, $N_2$ etc.). Hydrogen-selective membranes can be created from inorganic, metallic or ceramic materials, each of which has characteristic hydrogen throughputs, operating temperatures and selectivity.

A catalytic membrane reactor (CMR) integrates a hydrogen selective membrane with a water gas shift catalyst, thereby enabling the production and separation of $H_2$. CMRs typically operates between at about 450° C. for favourable fast kinetics for the WGS reaction. Furthermore, the CMR allows greater-than-equilibrium conversion to be attained, as the continuous depletion of the $H_2$ product through the membrane pushes the WGS reaction to the product side. The continuous extraction of $H_2$ in situ can allow CO conversions of almost 100%.

Palladium is the best known alloy membrane material, having an ability to permeate hydrogen between 300 to 600° C. whilst being tolerant to syngas species such as CO and $H_2O$. However, the high cost of palladium (~$US 330/m²/μm (2014)), has driven research towards minimising its consumption, most notably through alloying with less-expensive metals, and minimising thickness by depositing very thin (<5 μm) layers on support structures with very fine pores.

A number of other metals exhibit very high hydrogen permeability, most notably vanadium, titanium, tantalum and zirconium. At 400° C., the hydrogen permeability of these metals is around two orders of magnitude greater than palladium, and the raw materials prices are significantly lower.

Of these metals, V has the widest alloying range, which means it has the widest scope for modifying the alloy properties to meet the demands of a CMR. However, vanadium exhibits poor mechanical stability under hydrogen making it unsuitable for use in industrial hydrogen separation processes. Vanadium tends to absorb hydrogen in high concentrations. As a consequence, the vanadium hydride is prone to brittle failure because hydrogen negatively influences the metallic bonding within the alloy.

Any material used for a $H_2$-selective membrane in a CMR must also have suitable formability/mechanical properties which allow the material to be fabricated into a desired configuration, such as planar or tubular membranes. For example, alloys used for the manufacture of tubular products normally exhibit a maximum elongation of 25 to 35% in mass production (via extrusion and drawing), and at least 10 to 20% if using a customised deformation process (with reduced deformation per pass and extensive anneals between passes).

U.S. Pat. No. 7,001,446 B2 discloses hydrogen-permeable membranes for separation of hydrogen from hydrogen-containing gases. The membranes are multi-layer having a central hydrogen-permeable layer with one or more catalyst layers, barrier layers, and/or protective layers. The central hydrogen-permeable layer is taught in some embodiments as comprising a hydrogen permeable metal or metal alloy, including alloys of vanadium. A large number of suitable alloys are generally taught being suitable for this hydrogen-permeable layer, for example as outlined in Table 1 of this US patent. However, it is noted that no specific alloy is taught as providing optimal properties for use as a membrane, and more particularly a tubular membrane suitable for a CMR.

It would therefore be desirable to provide an alloy and a membrane formed using said alloy having appropriate hydrogen transport, mechanical stability and formability for use in a CMR, preferably as a tubular membrane for a CMR.

SUMMARY OF THE INVENTION

A first aspect of the present invention provides a vanadium alloy essentially consisting of:
  vanadium; and
  aluminium having a content of greater than 0 to 10 at %.

The alloy of the first aspect of the present invention finds particular application in a catalytic membrane reactor, particularly for a tubular membrane of a catalytic membrane reactor.

The inventors have determined that a vanadium based alloy should exhibit the following key properties in order to be optimally used as an alloy membrane within a CMR reactor:
  Good diffusivity/absorption ratio, in which high $H_2$ permeability can be achieved while minimising hydrogen embrittlement effects;
  Good formability, including good ductility (at least 10% elongation), allowing manufacturing of a desired configuration of alloy membrane preferably using existing or known manufacturing processes; and
  Mechanical stability, in particular, suppression of the α to β hydride phase transition to around or lower than a desired CMR shutdown temperature. This would allow the selected alloys to be cycled between a selected operating temperature, for example 400° C., and a (lower) shutdown temperature, for example ambient temperature, without undergoing a potential catastrophic phase change.

Extensive experimental trials were conducted by the Applicant to determine the most suitable V alloy (discussed in detail below). Numerous alloys were investigated including V—Al, V—Ni, V—Cr and V—Ti—Al based alloys. V—Al-based alloys were identified as having the required mechanical properties for tube manufacture, for example by tube drawing, rolling or extrusion, whereas V—Ni and V—Cr alloys were too brittle for this manufacturing route. Combined with favourable permeation properties. V—Al alloys were selected as they had surprisingly good and optimal properties which meet the above criteria, particularly when compared to other V-alloys investigated.

The alloy of the present invention is a vanadium-based alloy. In some embodiments, the vanadium content is from 85 to 98 at %, preferably from 90 to 96 at %, and more preferably from 90 to 95 at %. In some embodiments, the vanadium content is from 92 to 98 at %, preferably from 92 to 96 at %.

The primary secondary alloying content of the alloy of the present invention is aluminium. The aluminium content ensures that the alloy comprises a vanadium solid solution with a body-centred cubic structure. Moreover, the inventors have found that the absorption of hydrogen decreases with increasing Al content, thereby increasing resistance to hydrogen embrittlement. It is noted that this is also the case for Ni and Cr, but not for Ti. However, as noted below aluminium is also selected on the basis of imparting other favourable properties in relation to mechanical properties and mechanical stability, including the α-hydride and β-hydride phase transition. The aluminium content of the alloy is greater than zero to 10 at %. In some embodiments, the aluminium content is from 0.1 and 9 at %, preferably 1 and 10 at %, more preferably from 2 to 8 at %, and yet more preferably from 3 to 7 at %. In other embodiments, the aluminium content is from 1 to 10 at %, preferably from 3 to 10 at %, more preferably from 2 to 6 at %.

Further studies indicated that the addition of grain refiner, such as titanium (Ti) and boron (B), further improved the desired properties of the alloy. Therefore, in some embodiments of the invention the vanadium alloy further includes grain refining elements selected from at least one of titanium (Ti), chromium (Cr), iron (Fe), nickel (Ni) and boron (B) having a content of greater than 0 to 5 at %. The selected alloy of the present invention therefore comprises a vanadium based alloy having the general solid state solution formula of:

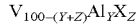

$V_{100-(Y+Z)}Al_Y X_Z$ wherein X=at least one of Ti, Cr, Fe, Ni or B; Y is >0 to 10; and Z is 0 to 5.

The inventors have found that the addition of Ti, Cr, Fe, Ni or B acts as a grain refining agent for the vanadium solid solution (Vss). The grain refining agent preferably changes the grain morphology from granular (with a grain size of several millimetres) to dendritic (with a primary spacing of less than 200 micrometres). Preferably, the grain refining agent is Ti or B.

Reduction of the grain size influences the formability of the product, particularly the ductility of a product or other element formed from the alloy. The maximum elongation of the alloy preferably exceeds 10%, more preferably greater than 15%, to provide the required formability for use as a membrane. The inventors have found that the addition of Al, Cr, Ni in contents greater than 2 at % all decrease the ductility of vanadium. However, the effect is much smaller for Al compared to the other elements. The amount of grain refining element in the alloy is greater than 0 to 5 at %, preferably greater than 0 to 2 at %. In some embodiments, the grain refining element has a content from 0.1 to 2 at %, preferably from 0.1 to 2 at %, and more preferably from 0.1 to 1 at %.

It is important that the alloy is mechanically stable across the operating temperatures of a membrane (particularly a membrane for a CMR). The transition from α-hydride (a body-centred cubic solid solution of vanadium with interstitial hydrogen) and β-hydride (a body-centred tetragonal solid solution with interstitial hydrogen) occurs at around 190° C. for pure V. This phase transition causes stress within the alloy, leading to fracture. The inventors have found that the addition of Ni and Cr both increase the critical transition temperature for hydride formation (Tc). Advantageously, the inventors have also found that the addition of Al decreases the transition temperature. For example, the addition of 10 at % Al decreases the transition temperature to less than 30° C. This allows a component, such as a membrane, formed from that alloy to be thermally cycled under an atmosphere of hydrogen. In the case of a membrane, that membrane could be thermally cycled from a high temperature such as 400° C. and a lower temperature such as ambient during start-up and shut-down of a CMR, without undergoing a phase transition which could cause fracture. In some embodiments, it is preferred that the alloy composition provides a phase transition temperature between the α-hydride and β-hydride phases of the vanadium alloy is less than 100° C., preferably less than 50° C., more preferably less than 30° C., and yet more preferably less than 20° C.

Vanadium contains significant levels of dissolved oxygen in commercial form. Oxygen can lead to embrittlement though reaction with dissolved hydrogen. However, the inventors have found that Al and Ti scavenge oxygen from vanadium. It is therefore preferable to provide an alloy comprising alloying components which reduce the oxygen content of the alloy. The oxygen content of the alloy preferably is less than 0.15 wt %, preferably less than 0.1 wt %, more preferably less than 0.05 wt %.

It should be appreciated that the vanadium alloy may include an impurity content, though typically a small impurity content. In preferred embodiments, the impurity content is less than 0.5 at %, preferably less than 0.1 at %, more preferably less than 0.05 at %.

The alloy of the present invention can be produced by any suitable method. In a preferred form, the alloy comprises a cast alloy.

A second aspect of the present invention provides an alloy for a hydrogen-selective alloy membrane, comprising a vanadium alloy according to the first aspect of the invention. In some embodiments, the hydrogen-selective alloy membrane comprises at least one tubular membrane.

A third aspect of the present invention provides use of an alloy for a hydrogen-selective alloy membrane, comprising a vanadium alloy according to the first aspect of the invention. In some embodiments, the hydrogen-selective alloy membrane comprises at least one tubular membrane.

A fourth aspect of the present invention provides a process of producing a vanadium alloy comprising:

forming a vanadium alloy according to the first aspect of the present invention; and heat treating the formed vanadium alloy at temperatures of from 800 to 1500° C. and pressures from 50 to 500 MPa, thereby producing a refined vanadium alloy suitable for a deformation process for forming a thin-walled tube.

Mechanical failure of alloys during tube production is normally related to the presence of porosity, and to low elongation as a result of poor microstructures, for example non-uniform distribution of grain sizes or non-equiaxed grains. Thus from a formability perspective, it is desirable that the microstructure of the alloy is created with small grain size and narrow size distribution. It is also preferably that the alloy is formed with minimal (or minimised) porosity. Casting and other forming processes produce an alloy having compositional homogeneity but microstructural inhomogeneity. Refinement of the grain size and greater microstructural homogeneity is achieved in the second aspect of the present invention through:

i) the addition of a grain refining element to the alloy, as defined in the first aspect of the present invention; and
ii) a heat treatment step.

Without wishing to be bound by any one theory, the Applicant has found that conventional heat treatment at ambient pressure (0.1 MPa) and in middle range of temperatures (200 to 600° C.) has almost no effect on reducing porosity and optimising microstructures by re-crystallisation due to the high liquidus and solidus of V—Al alloys (for example a $V_{95}Al_5$ alloy, has a melting temperature in excess of 1900° C.). A different heat treatment regime is therefore required.

The heat treatment step of the present invention uses the application of temperature and pressure to enhance the microstructural homogeneity of the formed vanadium alloy. The refined vanadium alloy has smaller more uniform grain distribution and preferably a reduced porosity compare to the same alloy cast without the heat treatment step. This microstructure enhances the formability of the alloy, including increasing the ductility of the alloy. The refined vanadium alloy preferably has a ductility of greater than 10% elongation, and more preferably greater or equal to 12% elongation. In some embodiments, the refined vanadium alloy has a ductility of greater or equal to 13% elongation, preferably greater or equal to 14% elongation, more preferably greater or equal to 15% elongation, more preferably between 13 and 20% elongation, yet more preferably between 13 and 18% elongation.

The process of the present invention preferably produces a vanadium alloy having a grain linear intercept of less than 5.0 mm, preferably less than 4.0 mm, even more preferably less than 3.0 mm, yet even more preferably less than 2.0 mm and most preferably less than 1.0 mm. all based upon a minimum sample size of 6 grains.

In particular embodiments the microstructure comprises dendrites. In these embodiments, the grain linear intercept value is preferably less than 500 micrometres, more preferably from 50 to 400 micrometres, even more preferably from 50 to 300 micrometres, and yet even more preferably from 100 to 200 micrometres, based upon a minimum sample size of 6 grains.

In addition, it is also preferred that the refined vanadium alloy does not include any voids having an average size of greater than 0.5 mm, preferably no greater than 0.3 mm. The grain linear intercept can be determined using method ASTM E112-113 through employment of the Olympus "Stream Essential" image analysis software Unless otherwise stated, the grain linear intercept is a measurement of width perpendicular to the growth direction of the grain in situations where the grain are not equiaxed (e.g. columnar).

The forming process can comprise any suitable forming process which produces compositional homogeneity within the formed alloy. In some embodiments, the forming process comprises a melt casting process, such as at least one of arc melting method or induction melting. In preferred embodiments, the forming process comprises at least one of a layer-by layer arc melting method, or a cold-crucible induction melting. The forming process may include the formation of an alloy ingot or billet.

The heat treatment step can comprise any suitable process which can apply the required temperature and pressure to the formed alloy. In one embodiment, the heat treatment step comprises a Hot Isostatic Pressing (HIP) process. HIP involves the simultaneous application of high temperature and pressure for a specified amount of time.

Both the application of temperature and pressure is important to obtain the required grain and microstructure refinement. The heat treatment step preferably comprises subjecting the vanadium alloy at temperatures of from 1000 to 1400° C., more preferably between 1100 to 1300° C., and yet more preferably temperatures up to 1400° C. In one embodiment, the heat treatment step is conducted at a temperature of about 1200° C. Similarly, the heat treatment step preferably comprises subjecting the vanadium alloy to pressures from 50 to 400 MPa, and more preferably 100 to 300 MPa. In one embodiment, the heat treatment step is conducted at a pressure of about 200 MPa.

The heat treatment step is typically undertaken for a selected length of time. In some embodiments, the heat treatment step is undertaken for a duration of at least 30 min, preferably at least 1 hr, and more preferably at least 2 hr. However, it should be appreciated that the duration depends on the composition, amount and configuration of the alloy undergoing treatment.

The heating and cooling rate applied to the alloy during the heat treatment step can also affect the refinement result. In some embodiments, at least one of the heating rate or cooling rate is at least 4 K/min, preferably at least 5 K/min, more preferably between 4 and 10 K/min, and yet more preferably between 4 and 8 K/min.

The heat treatment step is preferably undertaken in an inert atmosphere, such as Argon.

In an exemplary embodiment, the cast alloy was subjected to the following conditions:
Temperature 1200° C.;
Pressure 200 MPa;
Duration 2 hr;
Heating/cooling rate 5 k/min; and
Argon protective atmosphere.

A fifth aspect of the present invention provides an alloy for a tubular membrane of a catalytic membrane reactor, comprising a vanadium alloy formed from the process according to the fourth aspect of the present invention.

A sixth aspect of the present invention provides a process of producing a tubular membrane comprising:
forming a refined vanadium alloy according to the process of the fourth aspect of the present invention; and
forming the refined vanadium alloy into a thin-walled tube.

The tubular membrane can have any suitable dimensions as described above. In some embodiments, the thin-walled tube comprises a tube having an outer diameter of between 2 to 25 mm and a wall thickness of from 0.05 to 1 mm, as discussed in more detail below.

It should be appreciated that tube production is a multi-step process, first involving the production of rods with the desired composition, microstructure and dimensions, followed by deformation of these rods into the desired final shape. Any suitable deformation process can be used, including drawing, rolling, extrusion casting, rod casting or a combination thereof can be used to form the tubes.

A seventh aspect of the present invention provides a membrane for a catalytic membrane reactor formed from the process according to the sixth aspect of the present invention. The membrane can have various configurations, for example planar, or tubular. In a preferred embodiment, the membrane comprises a tubular membrane.

An eighth aspect of the present invention provides a catalytic membrane reactor (CMR) including at least one tubular membrane formed from the process according to the sixth aspect of the present invention.

The membrane of the present invention can have any suitable configuration. In some embodiments, the membrane comprises a substantially planar membrane. In other embodiments, the membrane comprises at least one tube. It should be appreciated that the various configuration of membranes are selected based on the particular advantages that configuration can provide to a particular CMR configuration.

A CMR is essentially a two-dimensional device which channels syngas along one dimension through a catalyst bed adjacent to a membrane. Flat membranes are easier and cheaper to produce than tubular membranes, but have a larger seal area, as the membranes are sealed around their outer edge. This sealing configuration provides more a large sealed area and therefore can be prone to leaks between the raffinate and permeate gas streams. A tubular membrane enables a tubular CMR to be used, and therefore can reduce the seal area. In tubular reactors seals (typically compression seals) are only required at each end of the tube.

In some embodiments, the membranes of the present invention have a tubular configuration, preferably comprising tubes. The tubes can have any desired dimensions. In some embodiments, the outer diameter is between 2 to 25 mm, preferably between 5 to 15 mm, and more preferably between 8 and 12 mm. In some embodiments, the wall thickness of the tube is less than or equal to 1 mm, preferably between 0.05 and 1 mm, more preferably less than 0.5 mm, and more preferably less than or equal to 0.2 mm. In one exemplary embodiment, the tubular membrane has the following specifications:

Length: ≥1000 mm
Outer diameter: 9.52 mm (⅜")
Wall thickness: ≤0.2 mm

Alloy membranes are metal hydrides, in which dissolved atomic hydrogen occupies interstitial sites between the metal atoms. Vanadium hydrides can adopt one of two main forms in the temperatures and pressures relevant to metal membranes—an $\alpha$-hydride (which is crystallography identical to the host metal, and in which the hydrogen atoms are randomly distributed in interstices within the body-centred cubic host) and a $\beta$-hydride (which is crystallographically distinct from the $\alpha$-hydride, and in which the hydrogen atoms are ordered in interstices within a body-centred tetragonal host). The $\alpha$ and $\beta$ phases can co-exist under certain concentration/temperature conditions. However, in most cases, the significant difference in lattice size between these phases results in significant stresses within the alloy, which can manifest wrinkling (in the best case) or pulverisation of the alloy (in the worst case). It is therefore preferable to avoid this phase transition when cooling the membrane in processes such as shut down of a CMR which includes an alloy membrane.

As previously noted, the composition of the alloy of the present invention is selected to avoid this phase transition during operation. In this respect, the hydride phase transition temperatures in a V—Al alloy are advantageous (where Tc<30° C. for $V_{90}Al_{10}$, at. %), which can be exploited to avoid this phase transition. In comparison, the transition temperatures in V—Ni (>400° C. for $V_{90}Ni_{10}$) and V—Cr alloys (>200° C. for $V_{90}Cr_{10}$), do not allow these alloys to avoid phase transition in the required operating range (between 0 and 500° C.). In fact, use of these alloys increases brittle failure when cooled from an operating temperature of around 400° C. to room temperature.

Use of an alloy membrane formed of the vanadium alloy of the present invention advantageously enables a CMR to be shut down from an operating temperature of around 400° C. to room temperature, typically 30° C. or less (preferably 20 to 30° C.), with the reactor operating within a typical operating hydrogen to metal (H/M) ratio range (typically greater than 0.05) without the membrane undergoing $\alpha$ to $\beta$ phase transition. A CMR can be operated, including start up and shut down procedures in a temperature range including its operating temperature and ambient temperature without going through phase transition, allowing simplistic operation of the reactor. This allows the CMR and membrane to be used through multiple cycles of operation, in which the CMR is started up, operated and shutdown. In particular, the brittle failure of the membrane during shutdown due to phase transition is avoided.

A ninth aspect of the present invention therefore provides a process for operating a catalytic membrane reactor comprising:

providing a catalytic membrane reactor including at least one tubular membrane comprising the vanadium alloy according to the first aspect of the present invention or formed by the process according sixth aspect of the present invention; and operating the catalytic membrane reactor at a hydrogen to metal (H/M) ratio of greater than 0.05 when the reactor is at an operating temperature between 0 to 350° C.

The step of operating the catalytic membrane reactor can include a number of procedures, including reactive operation of the reactor, start-up and shutdown procedures of the reactor and any other reactor applications or operating actions and/or processes in which those conditions may apply.

In some embodiments, the operating temperature is between 20° C. and 300° C., more preferably between 30° C. and 250° C., and even more preferably between 40° C. and 200° C. Similarly, in some embodiments the H/M ratio is greater than 0.1, preferably greater than 0.2, even more preferably greater than 0.3.

The operation of a catalytic membrane reactor including tubular membrane comprising the vanadium alloy/refined vanadium alloy of the present invention offers significant operational advantages compared to catalytic membrane reactor including tubular membranes formed from vanadium or other conventional vanadium alloys. For V and other V alloys, the $\alpha$ to $\beta$ phase change occurs in the operating conditions noted above. Any phase change can deferentially affect the properties and thus life of the tubular membrane. Thus, a reactor including tubular membrane comprising the vanadium alloy/refined vanadium alloy of the present invention can advantageously be started up, operated at reaction temperatures and shut down within a wide range of temperatures and H/M ratio conditions (>0.05) without the need to significantly alter the conditions within the reactor, particularly the H/M ratio.

The operation of the reactor includes start-up and shutdown procedures of the reactor. Start-up typically includes heating of the reactor from room temperature to the operating temperature. Shutdown typically includes cooling of the reactor from the operating temperature to another temperature, typically room temperature. Again, room temperature preferably comprises ambient temperature. In some embodiments, room temperature comprises 30° C. or less, preferably from 10 to 30° C., and more preferably from 20 to 30° C.

In some embodiments, the operating conditions include a cooling step of the catalytic membrane reactor, preferably comprises ambient cooling of the catalytic membrane reactor. However, it should be appreciated that other cooling regimes may be used, such as assisted cooling using a cooling device such as a heat exchanger, fluid cooling, convective cooling or the like.

It should be appreciated that unless otherwise specified experimental parameters are determined as the average of at least six measurements.

BRIEF DESCRIPTION OF THE FIGURES

The patent or application file contains at least one figure executed in color. Copies of this patent or patent application publication with color figures(s) will be provided by the Office upon request and payment of the necessary fee.

The present invention will now be described with reference to the figures of the accompanying drawings, which illustrate particular preferred embodiments of the present invention, wherein.

DETAILED DESCRIPTION

Figure 1:
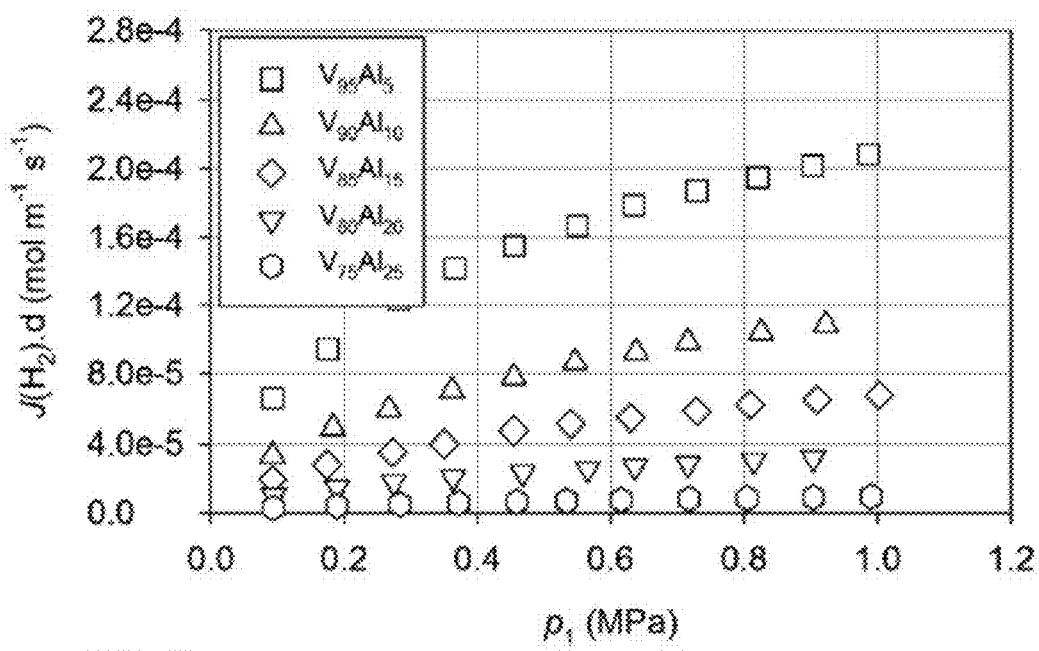
FIG. 1 provides a graph of measured $H_2$ flux (J, normalised against the inverse of membrane thickness, x) versus feed $H_2$ pressure for (a) V—Al; and (b) V—Cr (bottom) at 400° C.
Figure 1:
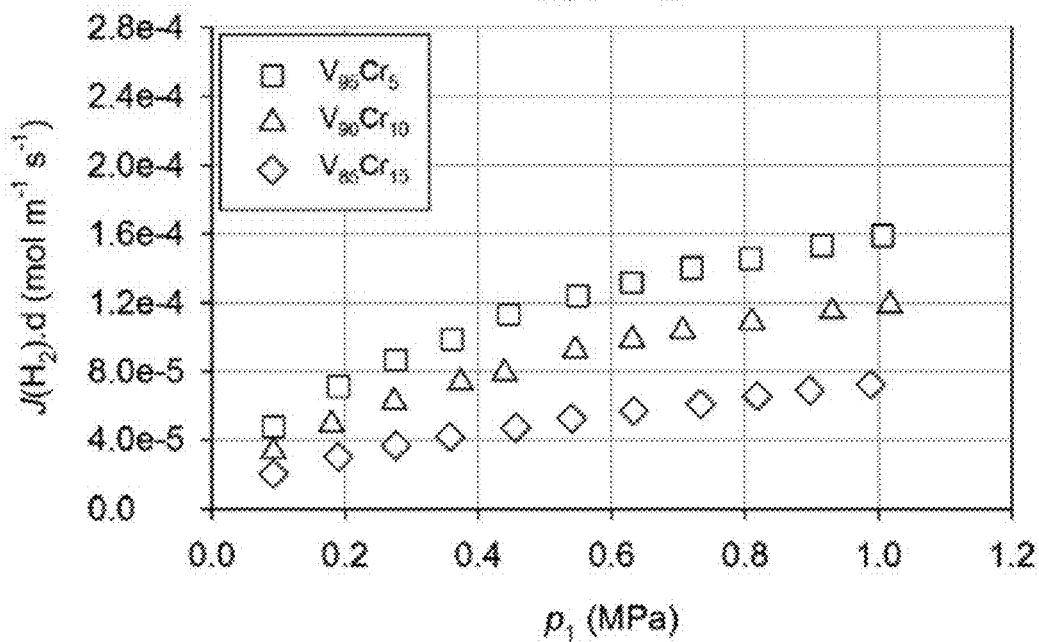

The present invention relates to an alloy, a method of producing a refined version of said alloy, and use of the alloy and refined alloy as a tubular membrane suitable for a catalytic membrane reactor (CMR).

Alloy Selection

The selected alloy is a vanadium based alloy having the general solid state solution formula of:

$$V_{100-(Y+Z)}Al_YX_Z$$

wherein X=Ti, Cr, Fe, Ni, B; Y is >0 to 10; and Z is 0 to 5.

The inventors determined that a vanadium based alloy should exhibit the following key properties in order to be optimally used within a CMR reactor:

Good diffusivity/absorption ratio, such that high $H_2$ permeability can be achieved while minimising hydrogen embrittlement effects;

Good formability, including good ductility (≥10% elongation), allowing manufacturing of a desired configuration of alloy membrane preferably using existing or known manufacturing processes; and Mechanical stability, in particular suppression of the α to β hydride phase transition to around or less than a desired shutdown temperature, meaning these alloys can be cycled between a typical operating temperature of a CMR, for example 400° C., and a (lower) shutdown temperature, for example ambient temperature, without undergoing a potential catastrophic phase change.

Extensive experimental trials were conducted by the Applicant to determine the most suitable V alloy (discussed in detail below). Numerous alloys were investigated including V—Al, V—Ni and V—Cr based alloys.

Selection Trial 1: V—Al, V—Cr and V—Ni

Method and Materials

Several binary V—Al ($V_{95}Al_5$, $V_{90}Al_{10}$, $V_{85}Al_{15}$, $V_{80}Al_{20}$, $V_{75}Al_{25}$, expressed as atom %) and V—Cr ($V_{95}Cr_5$, $V_{90}Cr_{10}$, $V_{85}Cr_{15}$) alloys were selected so as to ensure formation of a single-phase body-centred cubic solid solution.

Circular membranes were prepared by sectioning arc-melted ingots using electrical discharge wire machining. Alloy compositions were verified chemically and were within 2% (relative) of the nominal composition. The preparation method, including surface preparation and the deposition of 500 nm-thick Pd catalyst layers, has been described in detail in Dolan M D. Non-Pd BCC alloy membranes for industrial hydrogen separation. J Membr Sci 2010; 362(1-2):12-28 (hereinafter referred to as "Dolan 2010"), the contents of which should be understood to be incorporated into this specification by this reference. Membranes were approximately 900 mm thick to ensure bulk diffusion was the rate-limiting step in hydrogen permeation.

Hydrogen flux was measured using the constant pressure method. Membranes were sealed compressively using copper gaskets inside an Inconel module which was heated to 400° C. under an inert atmosphere and held for 12 h. A mixture of 10% $CO_2$ in $H_2$ was supplied to the feed surface at rates sufficient to prevent concentration polarisation. Ar was fed to the opposing surface, also at rates sufficient to prevent concentration polarisation. Each condition was maintained for around 1 h to ensure the attainment of steady-state flux conditions. The feed pressure was progressively increased from ~1 to ~10 bar(a), while the sweep pressure was maintained at ~1.5 bar(a) throughout the experiment. The $H_2$ content in the permeate stream was measured using a gas chromatograph calibrated against certified standard gas mixtures. Flux was then calculated based on the permeate $H_2$ concentration, and the flow rate of Ar. The detection of $CO_2$ in the permeate stream was indicative of a membrane defect, and the experiment was terminated accordingly.

The hydrogen absorption of each alloy was measured manometrically. Samples were held at 400° C. for 24 h under vacuum to ensure any residual $H_2$ from the flux measurement was purged from the sample. Isotherms were then generated between ~15 and 0 bar, using an initial 15 bar absorption step followed by stepwise desorption steps.

Lattice parameter measurements were made after permeation and absorption testing. Alloys were ground into a powder using a Philips planetary mini mill. These powders were sealed into glass tubes under vacuum, followed by a stress-relief annealing at 450° C. for 16 h. A Bruker D8 Advance X-ray Diffractometer using CuKα radiation (40 kV, 40 mA) equipped with a LynxEye silicon strip detector was employed to obtain the XRD patterns. The powder samples were scanned over the 2θ range 20°-130° with a step size of 0.02° 2θ and a count time of 3.2 s per step. Lattice parameters were determined using the software package Diffrac.Topas (Bruker AXS).

Results

X-ray diffraction measurements confirmed each alloy was a single-phase, vanadium solid solution (VSS).

FIG. 1 shows the variation in measured flux with hydrogen partial pressure in the feed (p1) for alloys in the V—Al and V—Cr series at 400° C. In each case flux has been normalised against the inverse of membrane thickness to correct for the small differences in sample thickness between each membrane sample. Hydrogen partial pressure at the permeate surface (p2) is also not accounted here for as it is negligibly small compared to the feed pressure. Several trends are evident. Firstly, for each alloy series, flux decreases with increasing Al or Cr content. Secondly, flux values for V—Cr alloys are greater than for the corresponding V—Al alloys.

According to Fick's first law of diffusion, the flux of a solute (H) through a solvent (the V-based alloy) is the product of the solute's diffusivity and concentration gradient. Knowledge of the dissolved hydrogen concentration at the hydrogen partial pressures corresponding to the flux values shown in FIG. 1 enables calculation the H diffusivity through each alloy.

Figure 2:
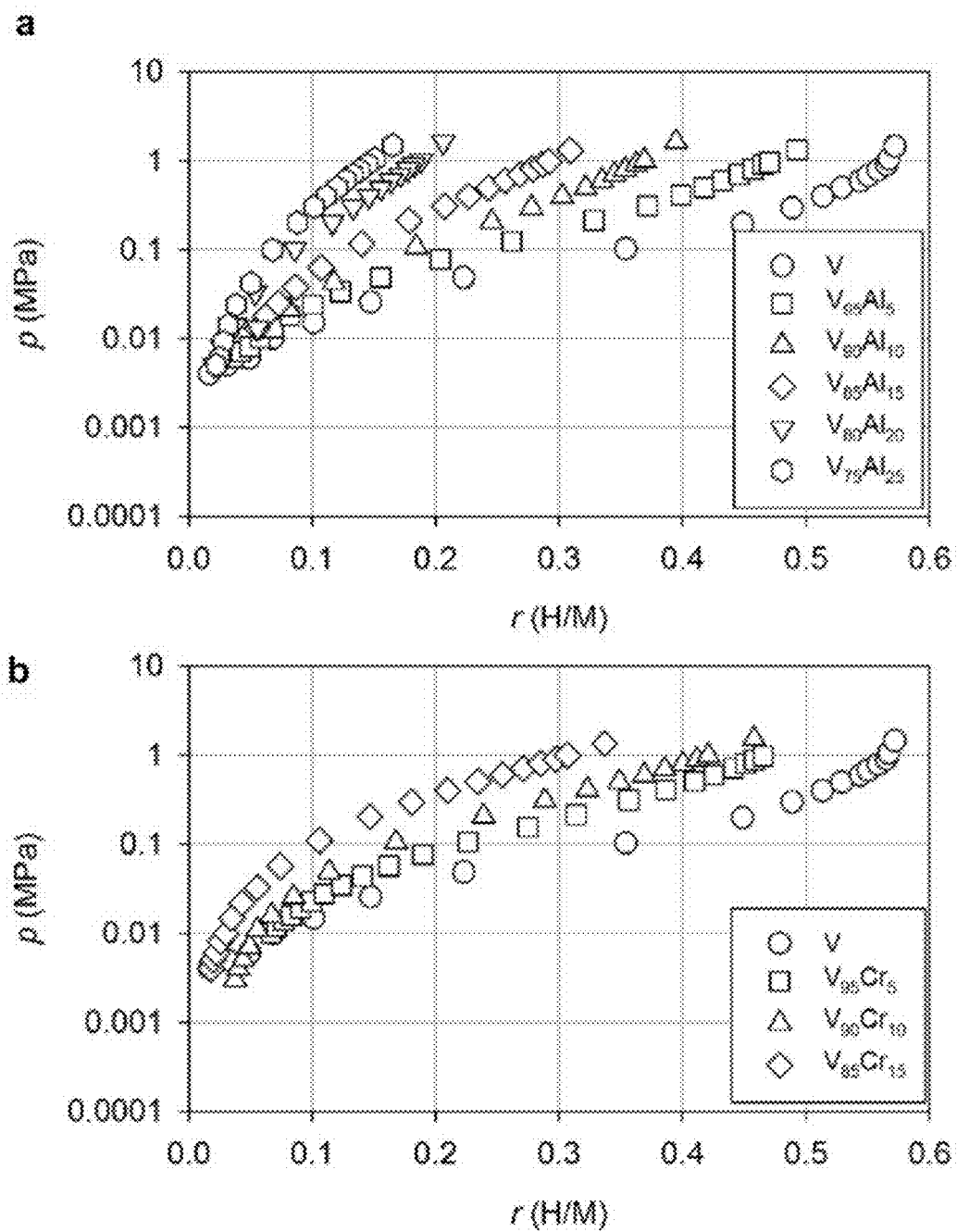
FIG. 2 provides a graph of measured hydrogen absorption (r, expressed as H/M ratio) with varying hydrogen partial pressure (p) for vanadium plus (a) V—Al; and (b) V—Cr alloys at 400° C.

FIG. 2 shows a series of hydrogen absorption isotherms for each alloy series, at 400° C., expressed as dissolved hydrogen concentration, r (with the units of atomic hydrogen/metal ratio, or H/M) against hydrogen partial pressure (p). In addition, the absorption isotherm for unalloyed vanadium is also shown for reference in each graph. The absorption data for V does not exhibit a plateau (which would indicative an α/β transition), but does exhibit a pronounced inflection (which indicates proximity to conditions under which an α/β transition would occur). Addition of Al makes this inflection less-defined, suggesting that Al stabilises V against β-hydride formation. The V—Cr isotherms are of a similar shape to that of V, exhibiting a pronounced inflection point. Unlike Al, it appears Cr does not stabilise V against β-hydride formation. This is an important consideration when assessing stability of these membranes during thermal cycling, when the alloys are likely to be subjected to conditions under which this hydride phase transition would occur. This is discussed in more detail below.

Concentration-dependent diffusivity coefficients ($D_H$) for each alloy at 400° C. were calculated from the measured flux and corresponding H/M values at the feed ($r_1$) and permeate ($r_2$) surfaces, as per the method described previously (Dolan M D, McLennan K G, Way J D. Diffusion of atomic hydrogen through V—Ni alloy membranes under nondilute conditions. J Phys Chem C 2012; 116(1):1512-8 (hereinafter referred to as "Dolan 2012") the contents of which should be understood to be incorporated into this specification by this reference).

Figure 3:
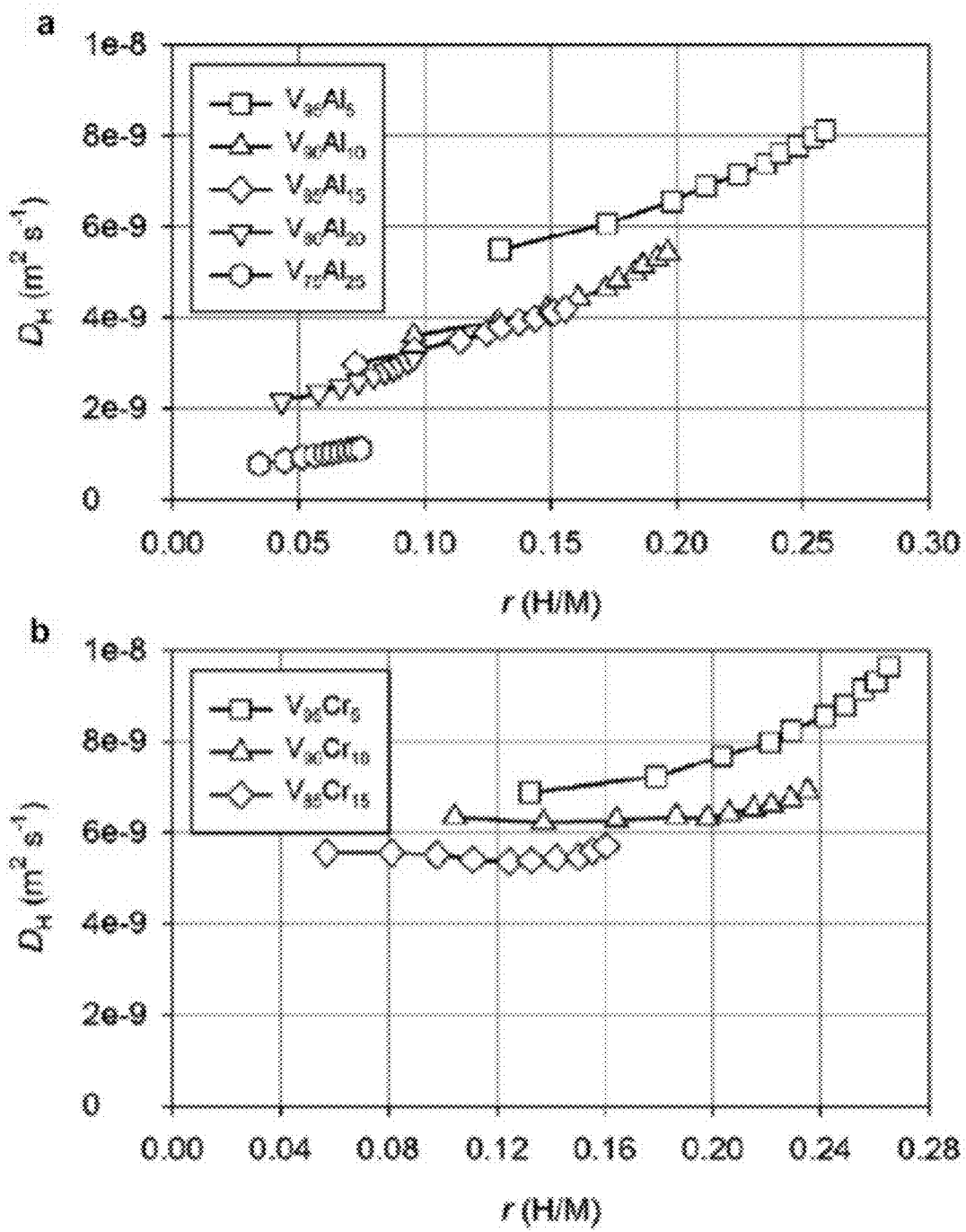
FIG. 3 provides a graph of concentration-dependent diffusion coefficients ($D_H$) for hydrogen through (a) V—Al; and (b) V—Cr alloys at 400° C.

For each binary alloy series, the substitution of V by Al or Cr decreases the diffusivity of hydrogen, $D_H$, and as FIG. 3 shows, Al reduces diffusivity more than Cr. Each alloy also exhibits a strong concentration-dependence, with $D_H$ increasing with increasing concentration of dissolved hydrogen.

The present work offers a comparison of two binary vanadium-based alloy systems (V—Al and V—Cr), building on the above referenced Dolan 2012 study of the V—Ni system. Each alloy in these series forms a single phase, body-centred cubic solid solution over the compositional range examined. This trend was not reflected in hydrogen absorption properties, with both alloying element decreasing hydrogen absorption, and aluminium having the most pronounced effect.

Calculated hydrogen diffusivities follow the trend V—Cr>V—Al>V—Ni, with the diffusivity of all alloys showing a strong concentration dependence.

Selection Trial 2: V—Ti—Al Alloys

Method and Materials

An alloy series with the formula $V_{90-x}Ti_xAl_{10}$, where X=0, 2, 4, 6, 8 and 10 has been devised to ensure 100% Vss phase formation and to provide a clear illustration of how the substitution of V by Ti impacts hydrogen transport. This will determine whether the properties of Ti can be exploited to develop a robust hydrogen separation membrane for high-temperature $H_2/CO_2$ separation and membrane reactor applications.

Membranes were prepared with the surfaces of each membrane disk were polished and coated with a 500 nm layer of Pd to minimise interfacial hydrogen transfer resistances as described in Dolan 2012. Each membrane was approximately 900 mm thick to ensure bulk transport of hydrogen was the rate limiting step for permeation. Samples from the same ingot were mounted and polished, and then examined in a scanning electron microscope using back-scattered electron (BSE) mode.

Hydrogen flux was measured at 623 and 673 K using the constant pressure method, in which feed and permeate pressures were held at constant values until a constant $H_2$ flux was recorded (typically 1800 to 3600 s). Feed pressure was progressively stepped through 0.1 MPa increments to a maximum of 1.0 MPa, and permeate pressures were maintained at 0.15 MPa for all measurements. A sweep gas (Ar) was used on the permeate side, and the flow rate was varied to ensure the $H_2$ content in the Ar was between 1 and 5%. The $H_2$ content in the sweep gas was determined using a gas chromatograph, calibrated for $H_2$ over the required concentration range.

Sieverts' method was used to measure bulk hydrogen absorption of each alloy between 0 and 1 MPa, at 623 and 673 K. Absorption isotherms were measured using an initial 1.5 MPa absorption step, followed by stepwise desorption steps to 0 MPa. Absorption and permeation were measured using the same samples to ensure consistency.

Lattice parameter measurements were made after permeation and absorption testing. Alloys were ground in a planetary mill and annealed under nitrogen at 723 K for 60,000 s in order to relieve stress and remove residual hydrogen. XRD patterns were recorded using a Cu-$K_\alpha$ source over the 2θ range 201-1301 with a step size of 0.021 and count time of 3.2 s. Lattice parameters were refined using the software package Diffrac. Topas (Bruker).

Results

Figure 4:
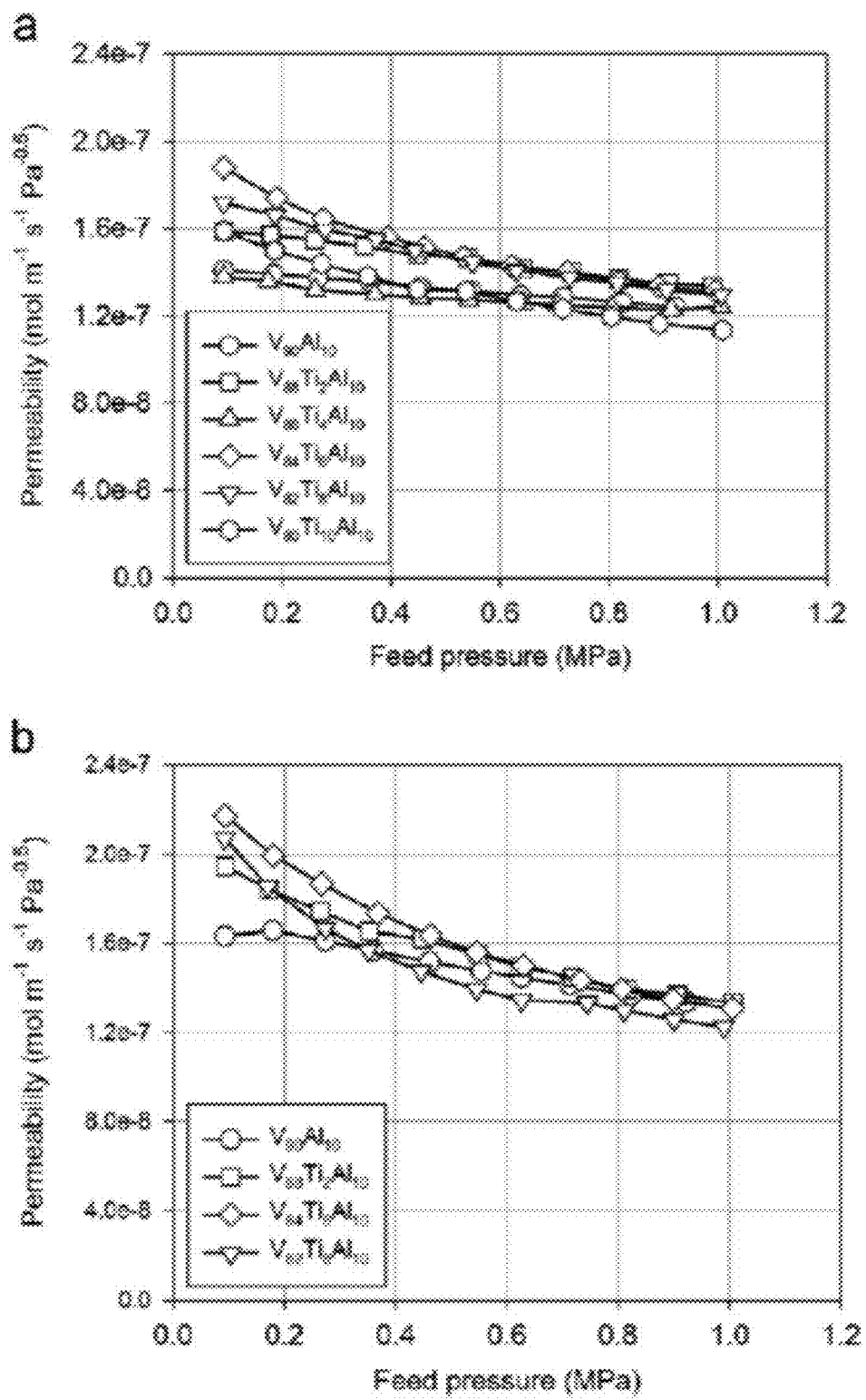
FIG. 4 shows the variation in calculated hydrogen permeability with varying feed pressure in $V_{90-X}Ti_xAl_{10}$ alloys at (a) 673K; and (b) 623K.

FIG. 4 shows the variation in hydrogen permeability with varying feed pressure, calculated assuming a $p^{-0.5}$ concentration dependence, for alloys in the $V_{90-x}Ti_xAl_{10}$ series at 673 (top) and 623 K (bottom). In each case, there is a clear decrease in calculated permeability with increasing feed pressure, indicating a departure from ideal Sieverts'-type behaviour. The permeability of several alloys could not be measured at 623K, despite multiple attempts due to brittle failure of the alloys. In the case of those alloys measured at both temperatures, permeability increases with decreasing temperature. Curves within a series almost overlay, indicating that the substitution of V by Ti has very little effect on permeability (as defined in the figure with a $p^{-0.5}$ pressure dependence) over the compositional range studied.

Figure 5:
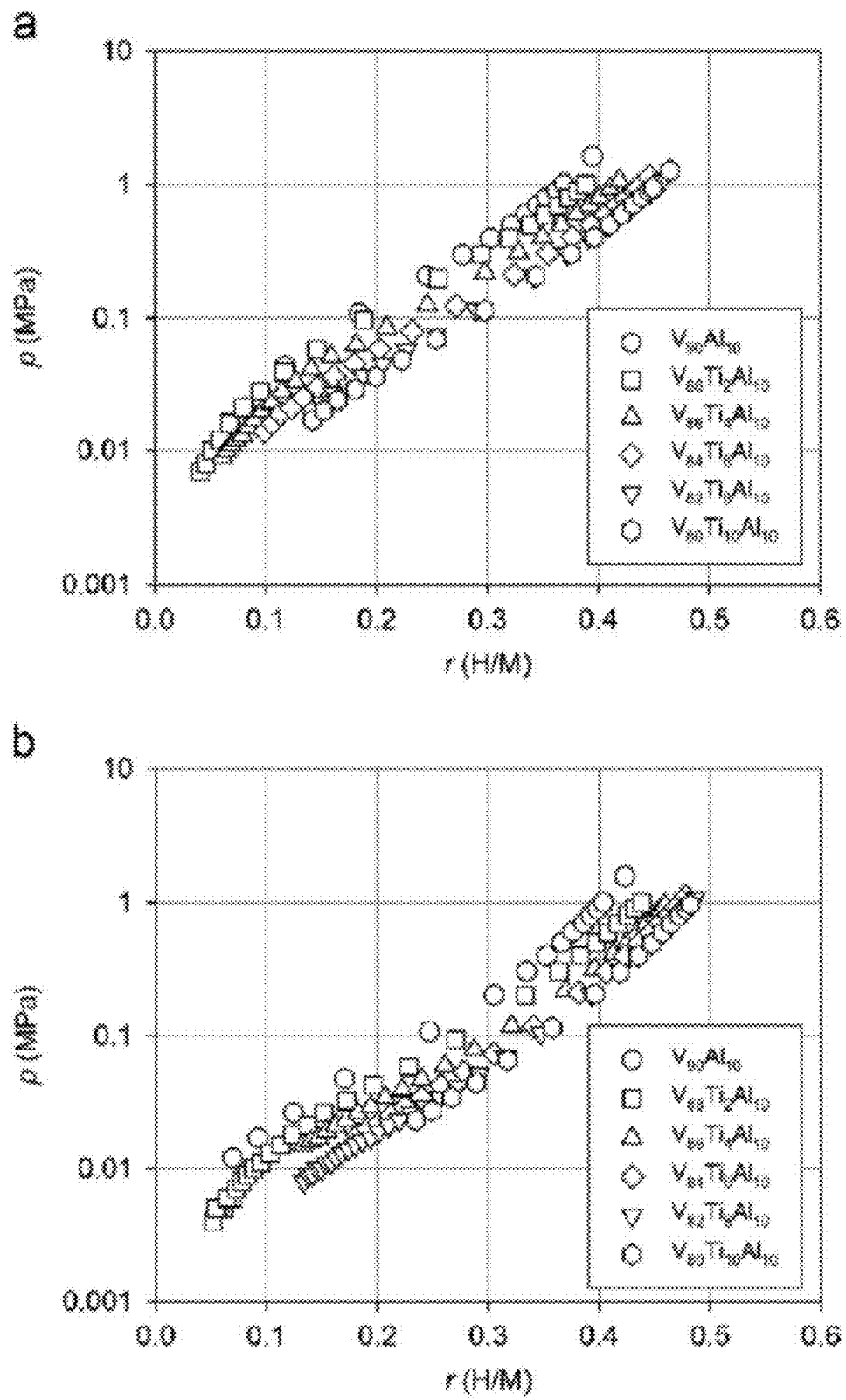
FIG. 5 provides a graph of variation in dissolved hydrogen concentration (r, with units of atomic hydrogen/metal ratio) with varying hydrogen pressure in $V_{90-X}Ti_xAl_{10}$ alloys at (a) 673K; and (b) 623K.

FIG. 5 shows a series of hydrogen absorption isotherms at several temperatures for all alloys in the $V_{90-x}Ti_xAl_{10}$ series. There is a clear compositional dependence with the dissolved hydrogen concentration (r) increasing with increasing Ti content. The 673K isotherms are almost linear, but an inflection at 623K across the entire series is indicative of the conditions moving closer to, but not entering, the (α-hydride+β-hydride) two-phase region.

Average Hydrogen diffusivities in V—Ti—Al alloys were calculated according to Fick's first law of diffusion by dividing the measured hydrogen flux (J) by the hydrogen concentration gradient ($d_C/d_x$). The concentration gradient corresponding to each flux measurement is calculated from the corresponding feed-surface ($r_1$) and permeate-surface ($r_2$) concentrations of dissolved hydrogen.

Figure 6:
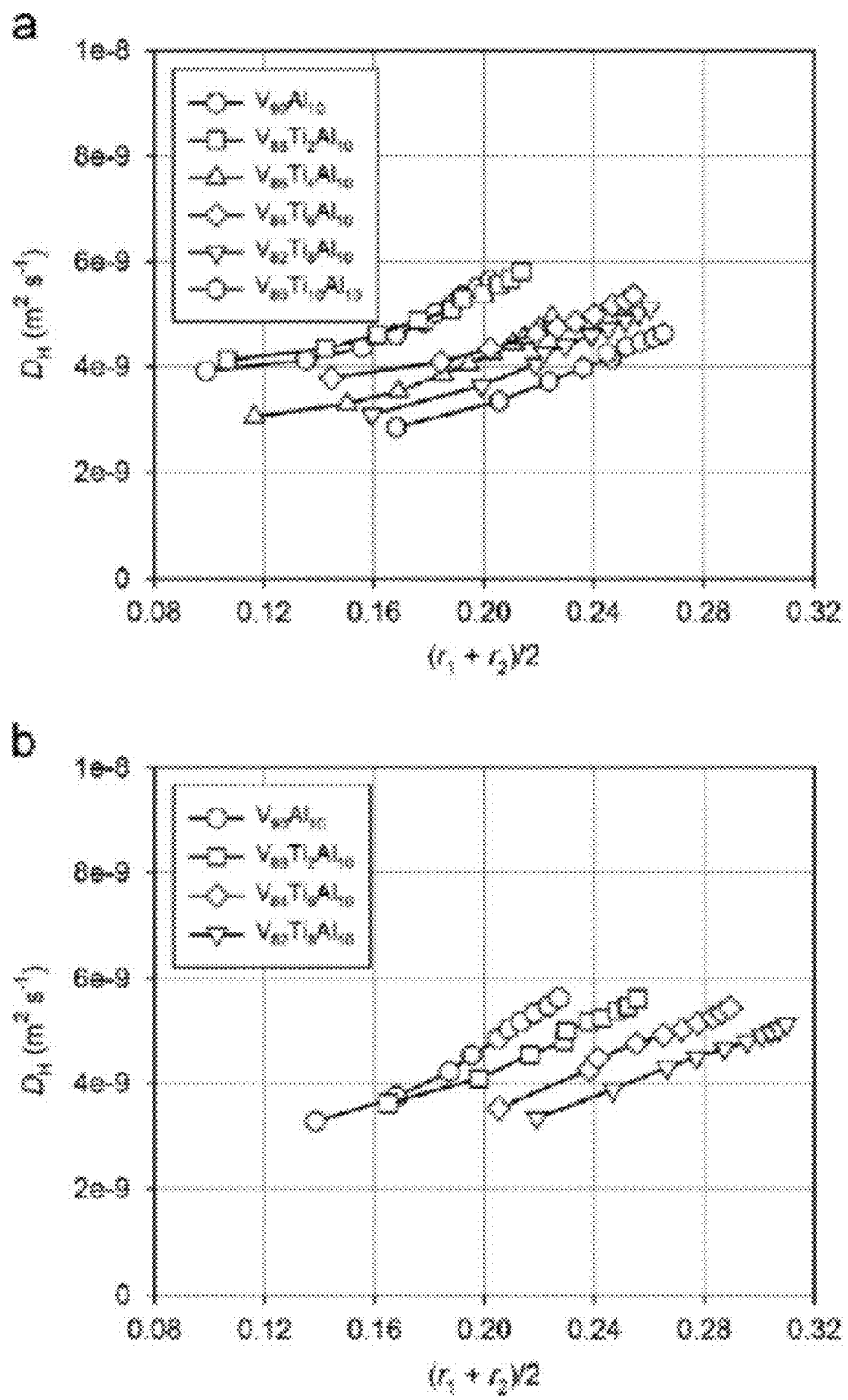
FIG. 6 shows the variation in average hydrogen diffusivities ($D_H$) with hydrogen concentration (r) in $V_{90-X}Ti_xAl_{10}$ alloys at (a) 673K; and (b) 623K.

FIG. 6 shows the variation in hydrogen diffusivity with average hydrogen concentration for each alloy at 673 and 623K. In each case there is a strong hydrogen concentration dependence, with $D_H$ increasing with increasing r. There is also obvious composition dependence, with $D_H$ decreasing for a given r with increasing Ti content. These data are in line with observed Ti-dependent absorption and Ti-independent permeability, in that the absorption and diffusivity trends are effectively cancelling each other out.

Grain Refinement

The substitution of V by Ti has the effect of increasing hydrogen absorption while decreasing hydrogen diffusivity. In the context of alloy membrane development, both are unfavourable modifications to the properties of the host $V_{90}Al_{10}$ alloy, and are in contrast to the previously stated aims of decreasing absorption (to minimise brittle-related failures) and maximising diffusivity to maximise permeation rates without incurring a mechanical penalty).

Figure 7:
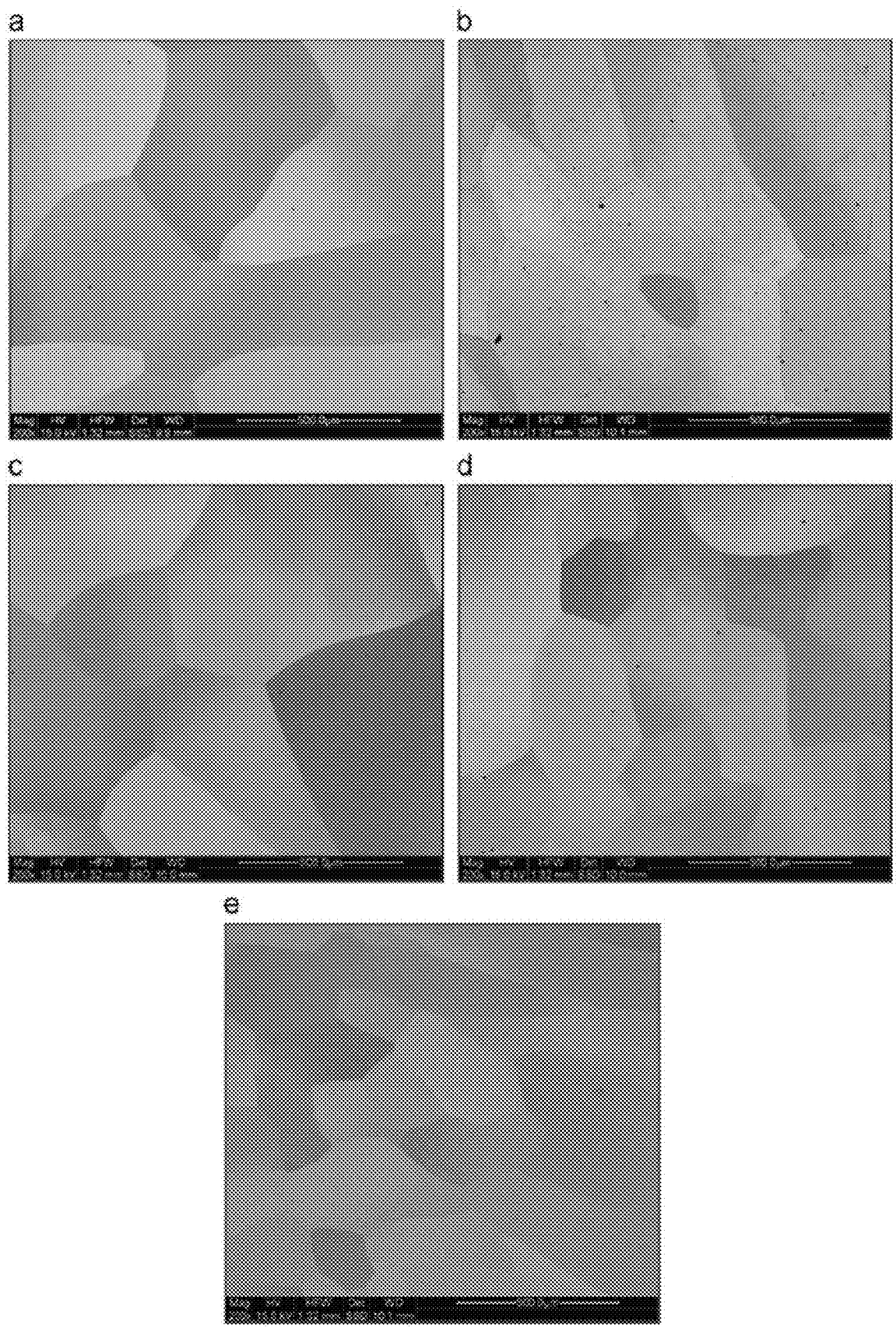
FIG. 7 provides five Electron micrographs (BSE mode) of (a) $V_{88}Ti_2Al_{10}$; (b) $V_{86}Ti_4Al_{10}$; (c) $V_{84}Ti_6Al_{10}$; (d) $V_{82}Ti_8Al_{10}$; and (e) $V_{80}Ti_{10}Al_{10}$.

As shown in FIG. 7, a comparison of electron micrographs of each of (a) $V_{88}Ti_2Al_{10}$, (b) $V_{86}Ti_4Al_{10}$, (c) $V_{84}Ti_6Al_{10}$, (d) $V_{82}Ti_8Al_{10}$ and (e) $V_{80}Ti_{10}Al_{10}$ shows that each alloy contains a single phase only, with differences in shading reflecting varying grain orientation. Furthermore, the grain size decreases with increasing Ti content, from >500 μm at 2% Ti to ~100 μm at 10% Ti. The microstructure of the $V_{90}Al_{10}$ alloy has been shown in past research to have a grain size of ~1000 μm. These results indicate that Ti acts as a grain refiner for V, and more particularly a V—Al alloy, reducing the grain size of the Vss phase.

Selection of Alloys

In terms of hydrogen diffusivity, the above results indicate that Ni, Cr, Al, and Ti, all clearly reduce the diffusivity of hydrogen. Unlike Ti, however, Cr, Ni and Al all decrease absorption, which imparts greater embrittlement resistance. This indicates that three prospective binary alloy systems V—Ni, V—Al (also referred to as V-1) and V—Cr (also referred to as V-2) may be suitable for use in an alloy CMR. The suitability of these alloy systems were investigated in more detail.

A. Hydrogen Absorption

The primary means of attenuating hydrogen absorption in vanadium, and thereby improving strength, is by alloying.

The Applicant has found that Al, Ni, and Cr impart favourable hydrogen absorption properties but not Ti. In fact, the absorption of hydrogen decreases with increasing Al, Ni and Cr content, thereby increasing resistance to hydrogen embrittlement.

Figure 8:
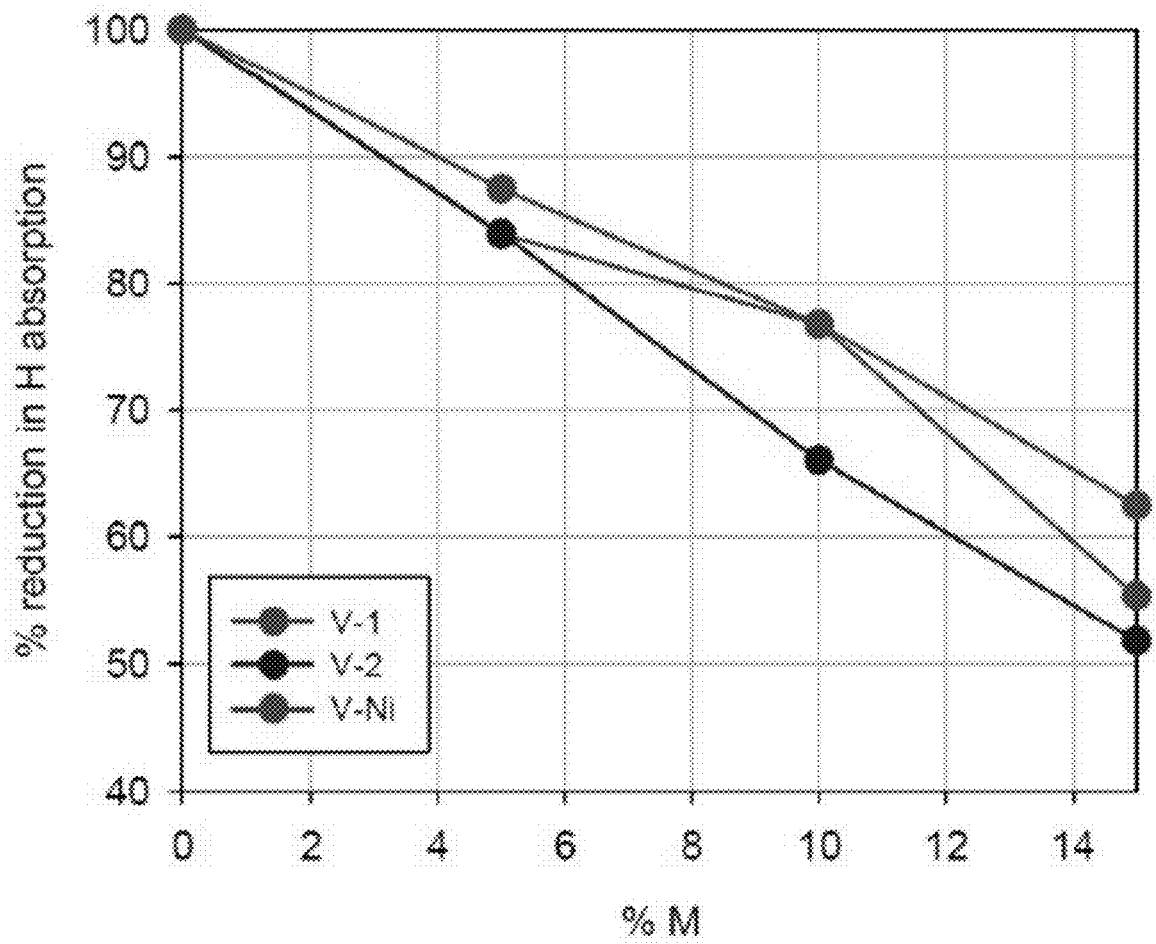
FIG. 8 provides a graph of reduction in H absorption of V—Ni, V—Al and V—Cr alloys at 400° C. and 10 bar.

A comparison of the effect of Al (V-1-$V_{25}Al_5$), Ni ($V_{95}Ni_5$) and Cr (V-2-$V_{95}Cr_5$) on hydrogen absorption of vanadium at 400° C. and 10 bar $p(H_2)$ is shown in FIG. 8. Each element reduces absorption by 50 to 60% when alloyed up to 15 at %.

B. Mass Transport

The rate at which hydrogen can be transferred across an alloy membrane is influenced by the membrane thickness, temperature, the concentration of absorbed hydrogen at each surface (which is related to alloy composition and hydrogen partial pressure) and the hydrogen diffusivity.

Figure 9:
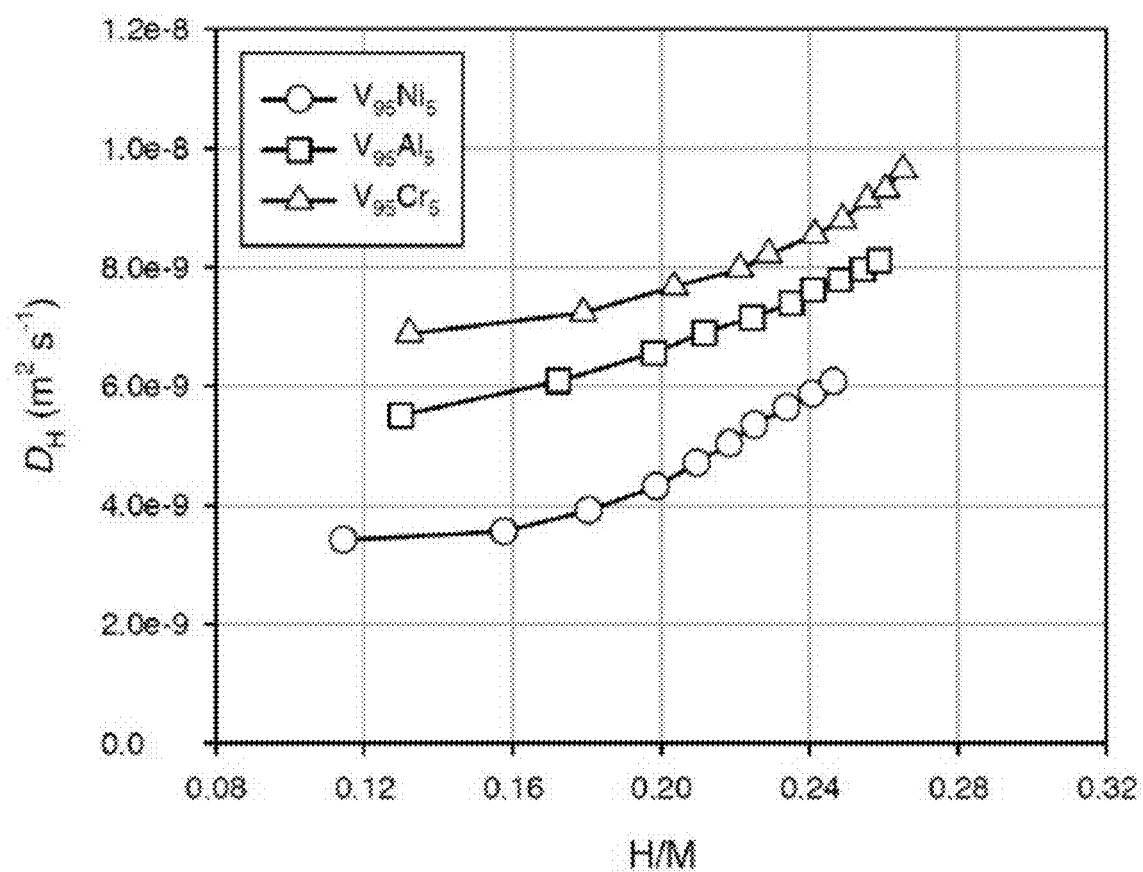
FIG. 9 shows the relationship between hydrogen diffusivity ($D_H$) and hydrogen concentration for V—Ni, V—Al and V—Cr alloys at 400° C.

FIG. 9 shows the relationship between hydrogen concentration and diffusivity for the three investigated V-based alloys at 400° C. The diffusivity of hydrogen increases with increasing hydrogen concentration in each of the alloys shown. The curved line on the graph represents constant hydrogen flux, i.e. an alloy with large D and low H/M will have the same performance as an alloy with small D and large H/M. As high hydrogen absorption leads to hydrogen embrittlement and mechanical failure, whereas diffusivity does not incur a mechanical penalty, it is desirable for the diffusivity/absorption curve to intersect the dashed line towards the upper left corner of the graph. Based on this criterion, the V—Al (V-1) alloy is superior, followed by the V—Cr (V-2) and V—Ni alloys respectively.

Figure 10:
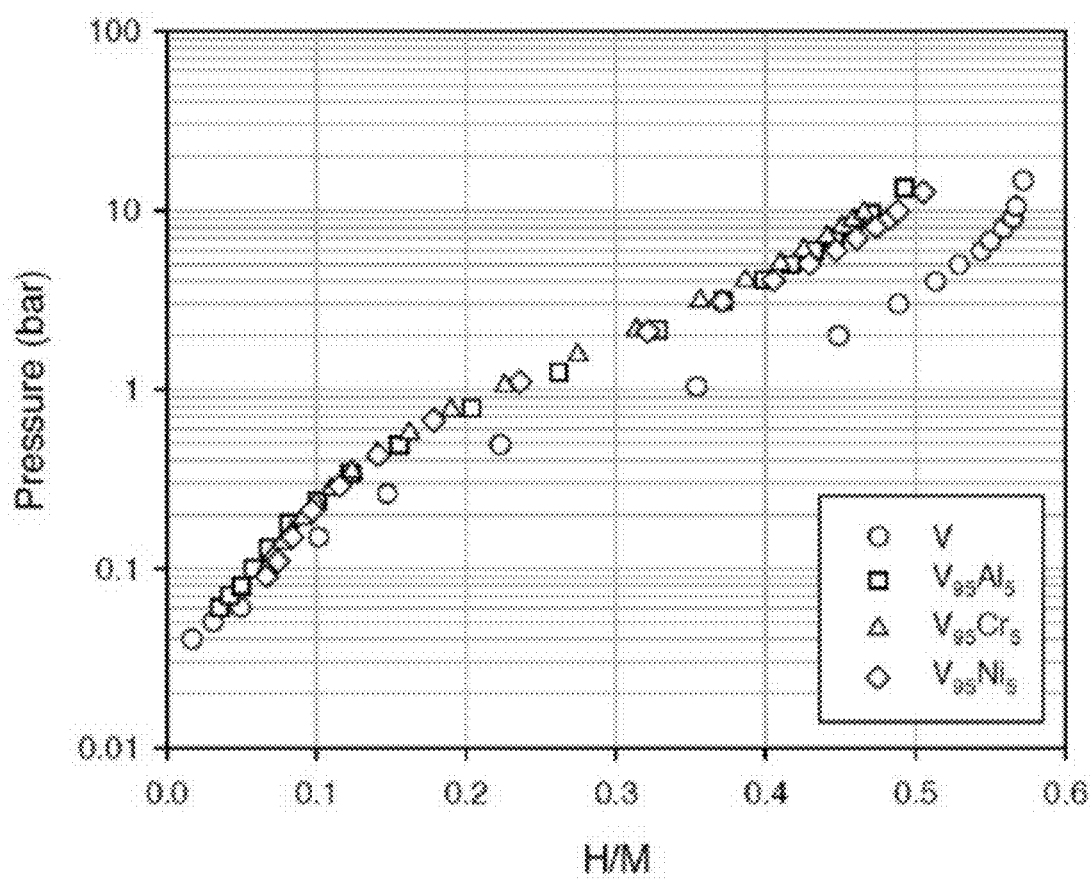
FIG. 10 shows the influence of Ni, Cr and Al on pressure dependent absorption (H/M) at an operating temperature of 400° C.

FIG. 10 shows that Ni, Cr and Al all reduce absorption (expressed as a ratio of dissolved hydrogen atoms to metal atoms, or HIM), as well as reducing diffusivity as shown in FIG. 9. While this reduces the overall hydrogen permeability, the fact that permeability is so much greater than Pd means that some decrease in permeability can be tolerated while still delivering acceptable hydrogen production rates.

C. Phase Stability

Metal hydrides can adopt one of two main forms—an $\alpha$-hydride (with a body-centred cubic structure incorporating interstitial hydrogen atoms) and a $\beta$-hydride (with a body-centred tetragonal structure incorporating interstitial hydrogen). The significant difference in lattice size between these phases results in significant stresses within the alloy, which can manifest wrinkling (in the best case) or pulverisation of the alloy (in the worst case). It is therefore desirable to avoid this phase transition during operation. Alloy membranes are most susceptible to this phase transition when cooled from operating temperature to another temperature such as ambient temperature, such as during reactor shutdown.

In order to examine the influence of alloying additions on the phase stability of vanadium during a simulated shutdown, X-ray diffraction measurements of vanadium hydride were undertaken using an X-ray diffraction beam line unit as detailed below.

Materials and Methods
Alloy Preparation

Dense, homogeneous V and V-based alloy ($V_{90}Cr_{10}$, $V_{90}Ni_{10}$, $V_{90}Al_{10}$, expressed as at. %) ingots were prepared via arc melting on a water-cooled copper hearth from high purity V, Cr, Ni and Al. For diffraction measurements, the ingots were sectioned using electrical discharge machining into 0.8 mm disks. Before testing each sample was polished to remove residual oxides, electroplated with 500 nm of Pd to promote the rate of hydrogen absorption, and annealed at 400° C. for several hours to promote adhesion between the Pd and vanadium alloy. Samples were crushed into a coarse powder for diffraction measurements. For absorption measurements, 1×3×10 mm pieces were cut from the same master ingot.

Diffraction Measurements

Diffraction measurements were undertaken during two separate synchrotron campaigns. During each campaign, samples were loaded into quartz capillaries and sealed into a static-pressure sample cell using a compression fitting with graphite ferrules. The cell was connected to a gas manifold which enabled vacuum purging and pressurising with static hydrogen. Samples were heated using a hot gas blower mounted perpendicular to the X-ray beam at a distance of 3 mm from the capillary wall. The X-ray beam wavelength and instrument parameters were calibrated using NIST SRM 660a (LaB6) and the temperature was calibrated using Pd as a thermal expansion standard.

Measurements were conducted using isobaric series in which pressure was maintained and temperature was as high as 450° C., down to 30° C., in several steps. Pressure was incrementally increased with each series. If a phase transformation was detected during an isobaric series, a fresh sample was loaded before the start of the subsequent series.

The initial measurement campaign was undertaken at the Australian Synchrotron (Melbourne, Australia) during June 2012, using the Powder Diffraction beamline. Powder diffraction measurements of the $V_{90}Ni_{10}$ and $V_{90}Al_{10}$ alloys were made using parallel beam geometry and a Mythen microstrip 1D detector. The wavelength used was 0.589 Å. The 0.7 mm OD sample capillary was oscillated through a 5° arc during measurements. A subsequent measurement campaign was undertaken at the Diamond Light Source (Harwell, UK) during March 2013, using the Extreme Conditions (115) beam line. Powder diffraction measurements of the V and $V_{90}Cr_{10}$ alloys were made using 1.5 mm OD capillary-mounted samples with parallel beam geometry and a Perkin Elmer flat panel 1621 EN detector. The wavelength used was 0.172 Å. The sample was oscillated through a 30° arc during measurements. Lattice parameters were determined by refining diffraction patterns using the Diffrac.Topas Rietveld-based software package, produced by Bruker AXS.

Figure 11:
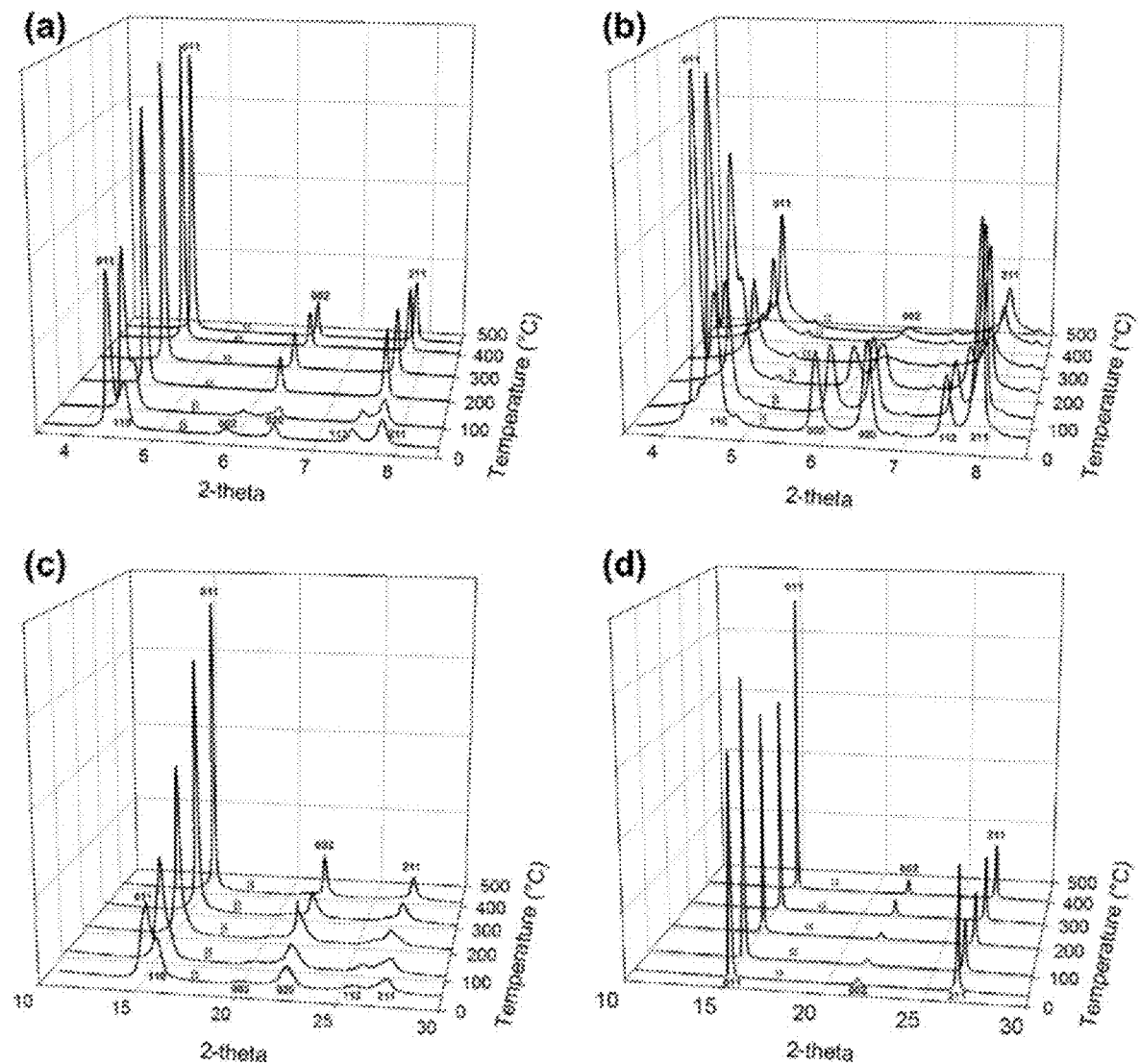
FIG. 11 illustrates X-ray diffraction measurements at 0.20 MPa of (a) V at k=0.1718 Å; (b) $V_{90}Cr_{10}$ at k=0.1718 Å; (c) $V_{90}Ni_{10}$ at k=0.5898 Å; and (d) $V_{90}Al_{10}$ at k=0.5898 Å.

FIG. 11 shows a series of X-ray diffraction patterns for vanadium at a pressure of 0.20 MPa and temperatures between 30 and 450° C. The Figure shows that vanadium exists as the cubic phase between 200 and 450° C., and as the tetragonal phase below 200° C., indicated by splitting of the (011), (002) and (211) peaks. This aligns well with the reported critical temperature (Tc) for vanadium hydride. For $V_{90}Cr_{10}$ at 0.20 MPa (FIG. 2b), the presence of the (020) and (211) peaks indicates at 200° C. indicates the transition occurs between 200 and 300° C. For $V_{90}Ni_{10}$ (FIG. 2c), the faint presence of (020) and (211) peaks at 400° C. indicates this transition occurs at a temperature slightly higher than 400° C. $V_{90}Al_{10}$ (FIG. 2d) maintained the cubic structure under all conditions.

Figure 12:
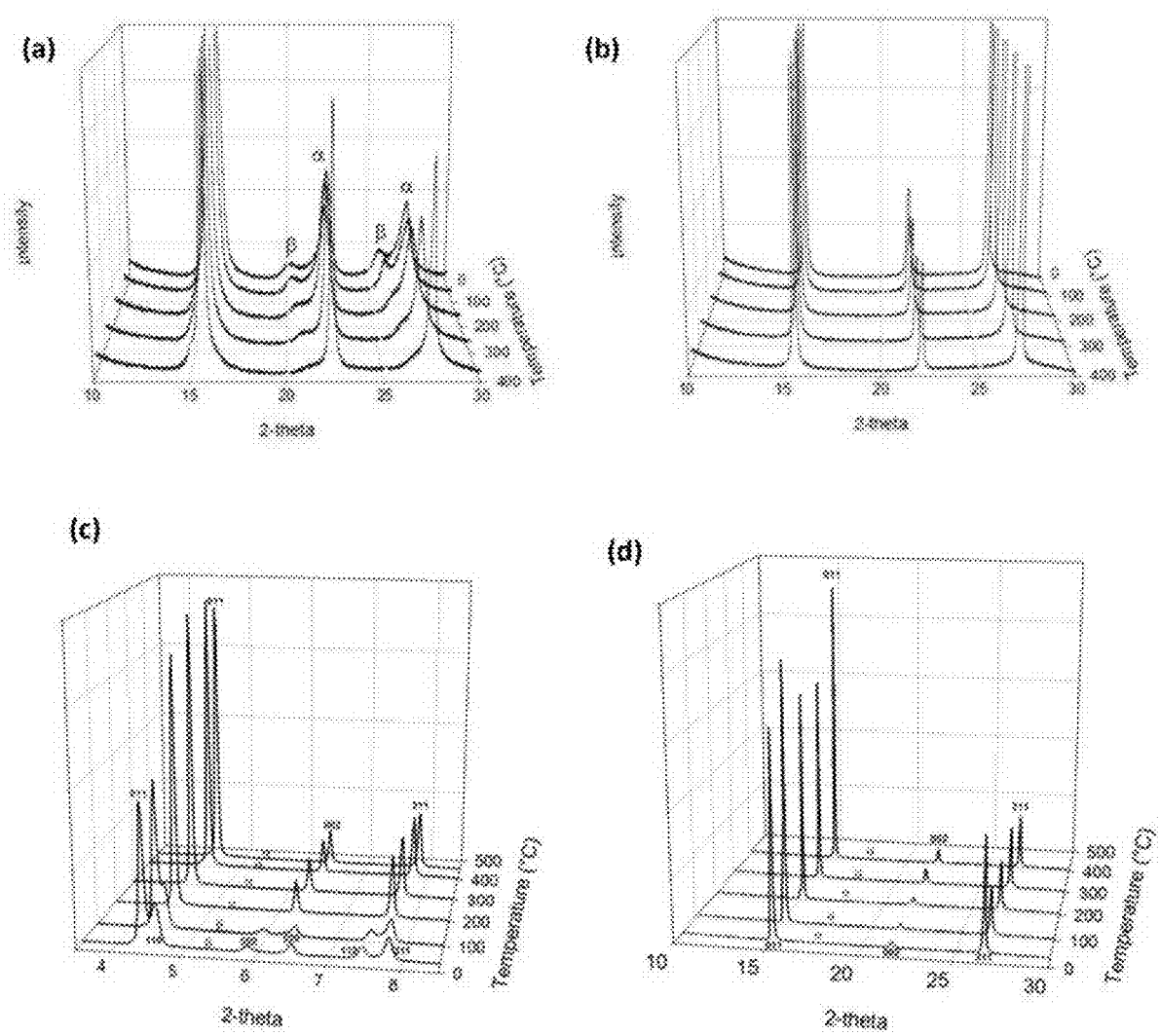
FIG. 12 illustrates X-ray diffraction measurements of (a) $V_{90}Ni_{10}$ (atom %, left); (b) $V_{95}Al_5$ alloy; (c) V; and (d) $V_{90}Al_{10}$ during cooling from 400° C. under hydrogen at 1 bar to ambient temperature.

Similar results are shown in FIG. 12 which shows the XRD patterns of (a) $V_{90}Ni_{10}$ (atom %); (b) $V_{95}Al_5$ alloy; (c) V; and (d) $V_{90}Al_{10}$ during cooling from 400° C. under hydrogen at 1 bar to ambient temperature under a hydrogen partial pressure of 1 bar. Clearly, the $V_{95}Al_5$ and $V_{90}Al_{10}$ alloy maintains the $\alpha$-hydride phase down to 30° C., whereas the V—Ni alloy forms the $\rho$-hydride phase from 300° C. and that the transition from $\alpha$-hydride and $\beta$-hydride for pure V occurs at 190° C. Similar experiments showed V—Cr (V-2) to crystallise the $\beta$-hydride from 200° C.

Addition of Ni and Cr both increase the transition temperature. Addition of 10 at % Al decreases the transition temperature to less than 30° C. This allows the membrane to be thermally cycled under an atmosphere of hydrogen (for example, during start-up and shut-down of a CMR containing an alloy membrane of that composition) without undergoing a phase transition which would cause fracture.

The V—Al (V-1) alloy is the clearly the optimum alloy as it does not undergo a phase transition between the studied temperature range of 30° C. to 400° C. as shown in FIGS. 11 and 12.

D. Oxygen Content

The oxygen content is less than 0.15 wt %. Vanadium contains significant levels of dissolved oxygen in commercial form. Oxygen can lead to embrittlement though reaction with dissolved hydrogen. Al and Ti scavenge oxygen from vanadium.

E. Formability

The formability of the V based alloy materials, especially with respect to elongation, determines the fabrication methods which can be used to produce planar or tubular membranes. For example, alloys used for the manufacture of tubular products normally exhibit a maximum elongation of 25 to 35% in mass production (via extrusion and drawing), and at least 10 to 20% if using a deformation process. One example is a deformation process with reduced deformation per pass and extensive anneals between passes.

In order to determine formability, the materials properties of the three studied alloy systems (V—Ni, V—Al and V—Cr) were examined. V metal has also tested to establish a benchmark for these alloys. Microstructural characterization and tensile testing were conducted to measure elongation of these alloys, in both as-cast and annealed states.

F-1 Sample Preparation and Testing

Pure metals were mixed and melted in an arc furnace or inductively-heated cold crucible furnace, and allowed to solidify on a water-cooled copper heath. The resulting ingots were cylindrical with a diameter of 50 mm, and length of 8 to 10 mm (arc-melted) 50 to 100 mm (cold crucible-melted). Specimens for tensile testing were then cut from the ingots by an arc wire cutting method. These specimens were annealed at 1250° C., for up to 1 hour, under an oxygen-free atmosphere. In order to study effect of deformation on elongation of V—Ni alloys, a $V_{85}Ni_{15}$ alloy (at %) sheet of 0.4 mm was produced by arc melting and rolling. Tensile specimens were cut and subject to annealing at 1250° C. for 1 hour. Tensile tests were undertaken with a 0.05 cm/min crosshead speed, maximum load of 2 KN and 8.5 mm gauge. As the majority of the alloys were too brittle to record yield strength, only elongation and UTS were measured. The ductility measurements were performed in accordance with ASTM E8/E8M.

Vanadium

The maximum elongation of vanadium was 15% (average of 3 samples), as shown in Table 1.

TABLE 1

Elongation and UTS of vanadium (3 separate measurements)

| Composition | Condition | UTS (MPa) | Elongation (%) |
|---|---|---|---|
| Pure V metal | As-cast by arc melting | 181 | 14 |
| Pure V metal | As-cast by arc melting | 209 | 15 |
| Pure V metal | As-cast by arc melting | 136 | 16 |

Vanadium-nickel Alloys

Addition of nickel to vanadium, in the range 5 to 15 atom %, resulted in complete loss of ductility, with maximum elongations of less than 1% recorded. Samples obtained by arc melting had slightly higher elongation than by cold crucible casting, which may be attributable to the lower porosity of arc melted alloys c.f. cold crucible-melted alloys.

TABLE 2

Elongation and UTS of V—Ni alloys

| Composition | Condition | UTS (MPa) | Elongation (%) |
|---|---|---|---|
| $V_{95}Ni_5$ | As-cast by Arc melting | 209 | 0.61 |
| | | 225 | 0.24 |
| | | 301 | 0.24 |
| | | 295 | 0.64 |
| $V_{90}Ni_{10}$ | As-cast by Arc melting | 302 | 0.64 |
| | | 434 | 0.32 |
| | | 372 | 0.32 |
| | As-cast by cold crucible casting (CC) | 191 | 0.19 |
| | CC & 1000° C. for 1 h | 221 | 0.16 |
| | CC & 1250° C. for 1 h | 322 | 0.24 |
| $V_{85}Ni_{15}$ | As-cast by AC, rolled and 1250° C. for 1 h | 134 | 0.94 |
| | | 148 | 1.88 |

Figure 13:
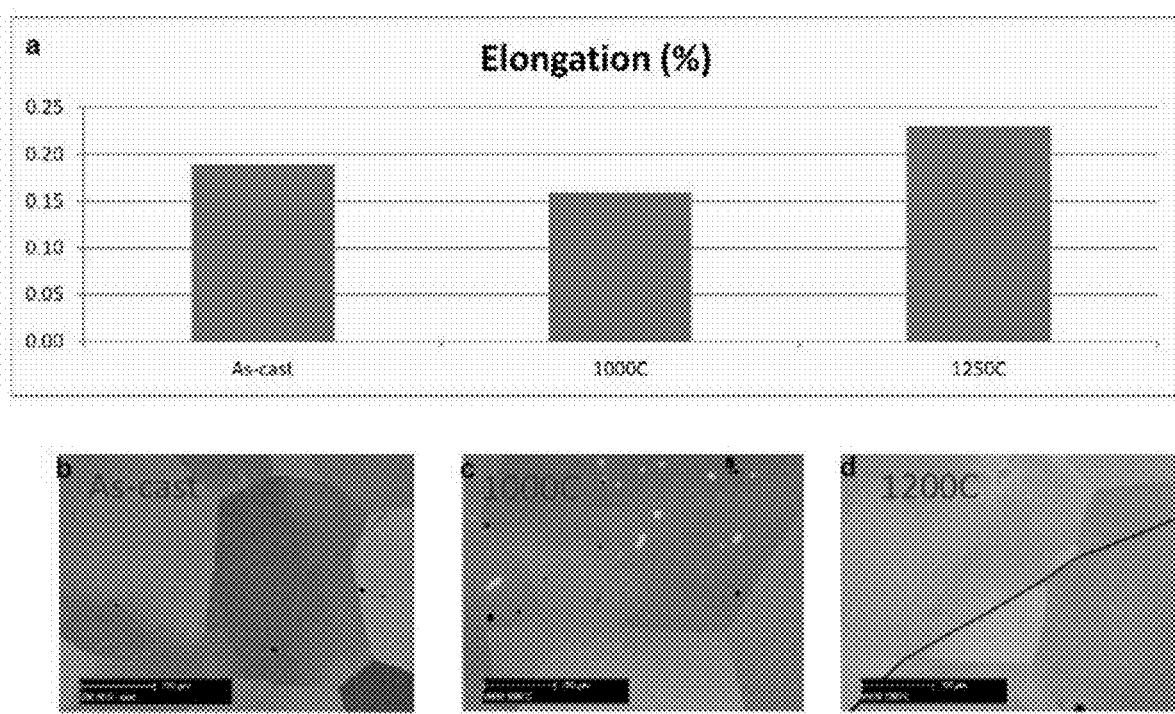
FIG. 13 provides a graph with accompanying SEM images showing elongation of $V_{85}Ni_{15}$ alloy before and after heat treatments in which (a) is a graph providing % elongation for each respective sample; (b) is an SEM image of the as-cast alloy; (c) is an SEM image of the 1000° C. heat treated alloy; and (d) is an SEM image of the 1200° C. heat treated alloy.

FIG. 13 shows the effect of heat treatment on the measured elongation of cold crucible-cast $V_{90}Ni_{10}$. Annealing at 1000° C. for 1 hour reduces elongation as a result of precipitation of secondary phases detrimental to elongation. With a further increase in the annealing temperature to 1250° C., the elongation is recovered, but it is still well below 1%. The highest elongation is achieved by the rolled sample of the $V_{85}Ni_{15}$ alloy at nearly 2%. However, this can still be described as a very brittle alloy.

The V—Ni based alloys investigated have very low ductility that cannot be improved significantly by alloying, casting, heat treatment and deformation. This severely limits this alloys ability to be formed into suitable sheet or tube by current industrial processes.

V—Al (V-1) Alloy $V_{95}Al_5$ (5%) and $V_{90}Al_{10}$ (10%) alloys showed far greater elongation than equivalent V—Ni alloys, as shown in Table 3.

TABLE 3

Elongation and UTS of V-1 alloys

| Composition | Condition | UTS (MPa) | Elongation (%) |
|---|---|---|---|
| V-1 (5%) | As-cast by Arc melting | 243 | 11 |
| | | 253 | 12 |
| | | 213 | 12 |
| V-1 (10%) | As-cast by Arc melting | 276 | 0.24 |
| | | 185 | 0.16 |

The V—Al based alloys investigated have sufficient ductility with 5% Al, but less than ideal ductility at 10% Al. The results suggest that an Al content of less than 10% is desirable, and preferably a content of around 5%. This alloy is the most suitable for sheet or tube formation by current industrial processes.

V—Cr (V-2) Alloys

Mechanical properties of V—Cr alloys are shown in Table 4:

TABLE 4

Elongation and UTS of V—Cr alloys

| Composition | Condition | UTS (MPa) | Elongation (%) |
|---|---|---|---|
| V—Cr (5%) | Annealed 950° C. for 1 hour | 360 | 0.32 |
| | | 304 | 0.24 |
| | | 205 | 0.16 |
| | | 225 | 0.20 |

TABLE 4-continued

Elongation and UTS of V—Cr alloys

| Composition | Condition | UTS (MPa) | Elongation (%) |
|---|---|---|---|
| V—Cr (10%) | Annealed 950° C. for 1 hour | 105 | 0.08 |
| | | 128 | 0.16 |
| | | 38 | 0.04 |
| | | 38 | 0.04 |

The V—Cr based alloys investigated have very low ductility that cannot be improved significantly by alloying, casting, heat treatment and deformation. This severely limits this alloys ability to be formed into suitable sheet or tube by current industrial processes.

F. Alloy Optimal Properties

Of the alloys investigated, the V—Al alloys clearly provide the required hydrogen permeability, phase transition, and mechanical properties, with significant advantages over the other binary alloy systems studied (V—Ni and V—Cr). In particular, V—Al based alloys have the required mechanical properties for tube manufacture, for example by tube drawing, rolling or extrusion, whereas V—Ni and V—Cr alloys were too brittle for this manufacturing route. Combined with favourable permeation properties. V—Al alloys were selected as they had surprisingly good and optimal properties which meet the above criteria, particularly when compared to other V-alloys investigated.

Of particular interest is the $V_{95}Al_5$ alloy system, which has optimal properties compared to the other binary systems studied. It is noted that the addition of between 0 and 5% of a grain refining elements such as Ti, Fe, Ni or Cr improves the formability and microstructure as discussed above.

G. Grain Refinement of $V_{95}Al_5$

The microstructure of a $V_{95}Al_5$ alloy was analysed with and without grain refining addition.

Ingot Preparation

Figure 14:
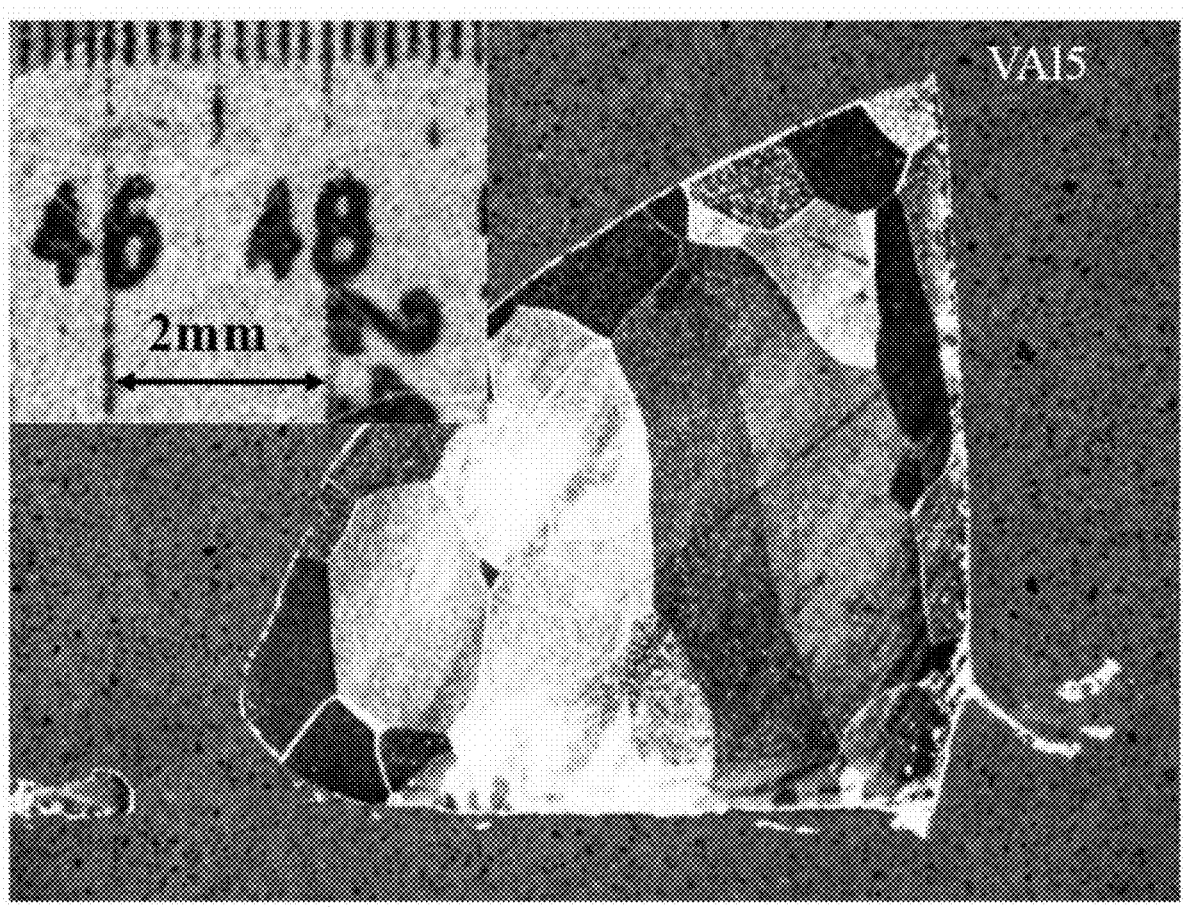
FIG. 14 shows an optical microscope cross-section of $V_{95}Al_5$ ingot without grain refiner.
Figure 15:
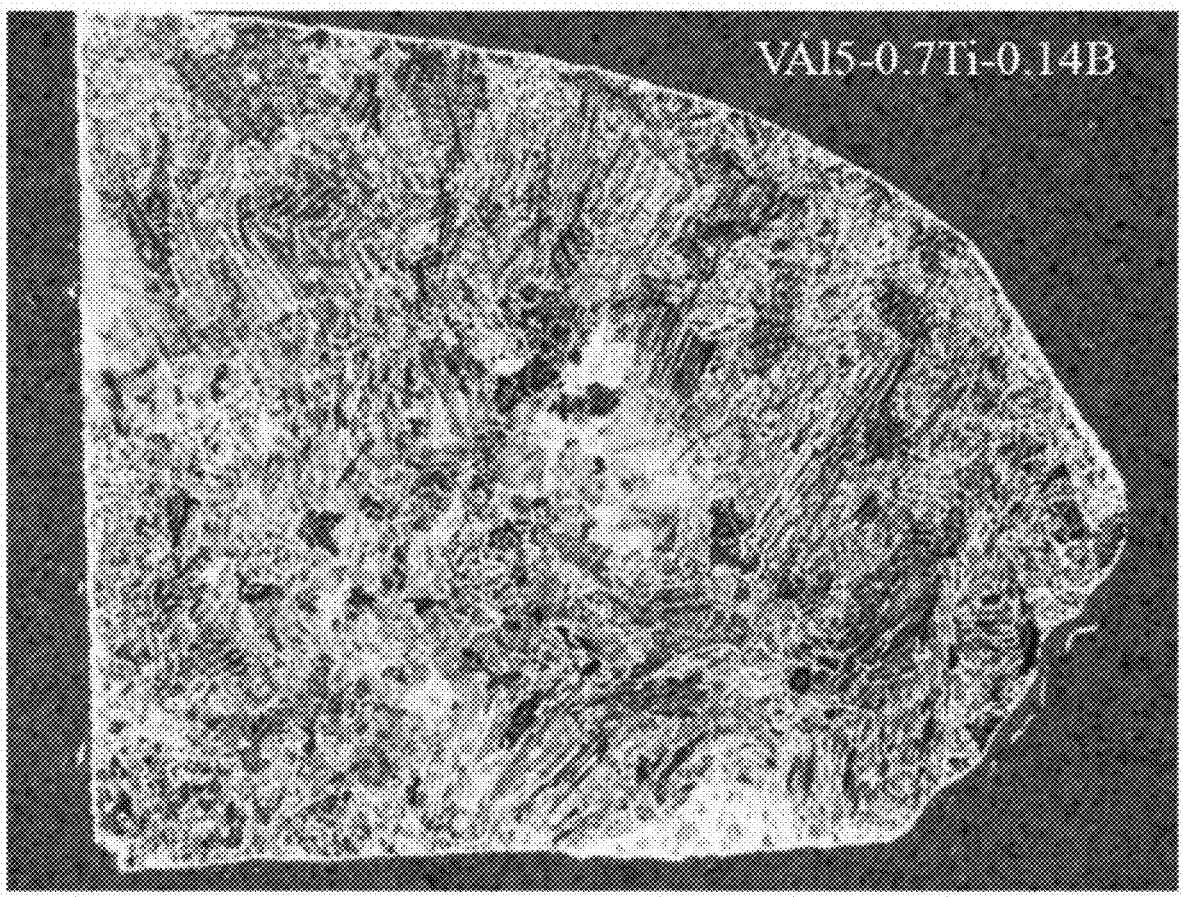
FIG. 15 shows an optical microscope cross-section of $V_{95}Al_5$ ingot with grain refiner.

For lab-scale processes, ingots of $V_{95}Al_5$ alloy with and without addition of grain refiner (B0.1 Ti0.7 wt %) were produced by arc melting. A cross-section of the ingot without grain refiner is shown in FIG. 14. A cross-section of the ingot with grain refiner is shown in FIG. 15. The ingot shows two distinct regions: a columnar region with grains perpendicular to the ingot surface, and a region of equiaxed growth in the centre of the ingot.

Exposed surfaces were photographed using an optical microscope and the resulting image was analysed to determine mean length intercept according to ASTM E112. Results are summarised in Table 5.

TABLE 5

Grain size of $V_{95}Al_5$, with and without grain refiner addition

Figure 16:
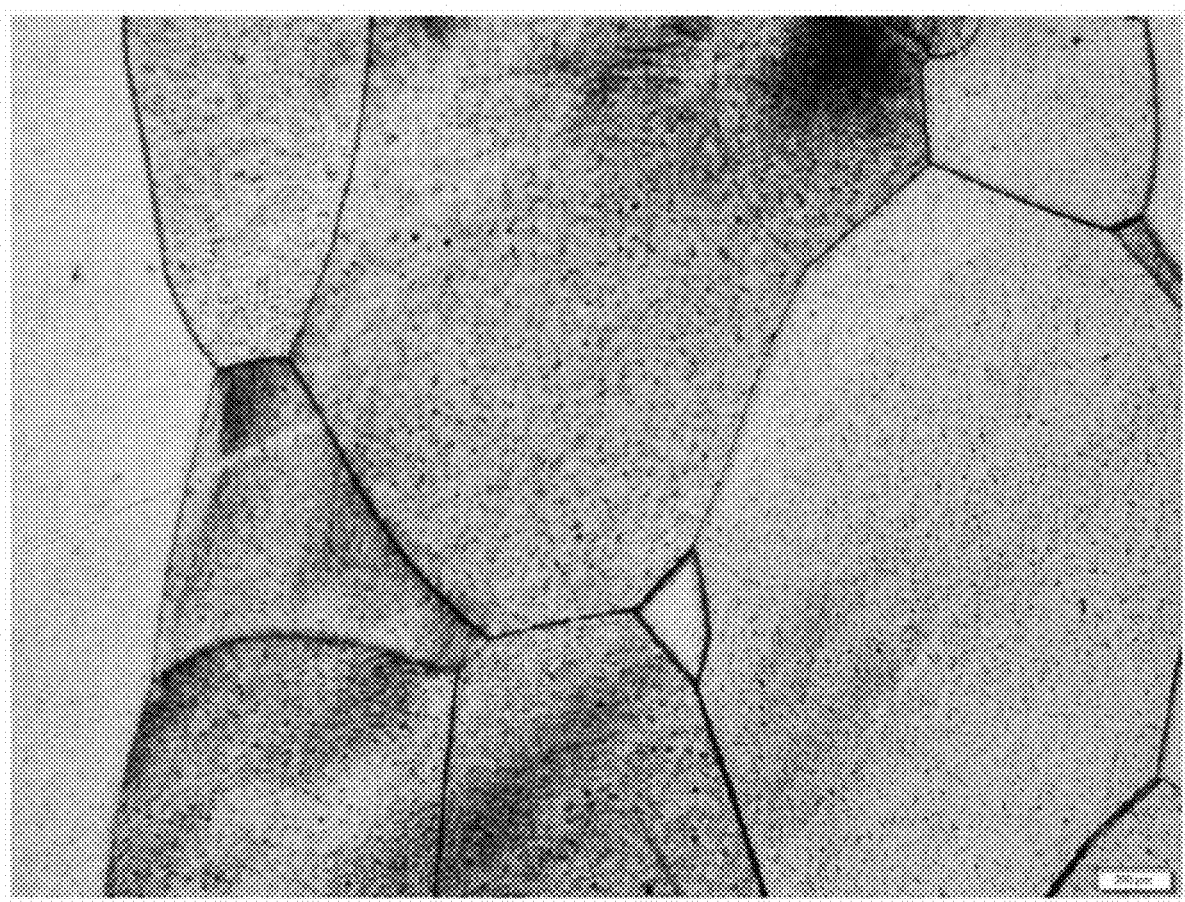
FIG. 16 provides an optical microscope image of an as-cast $V_{95}Al_5$ alloy.
Figure 17:
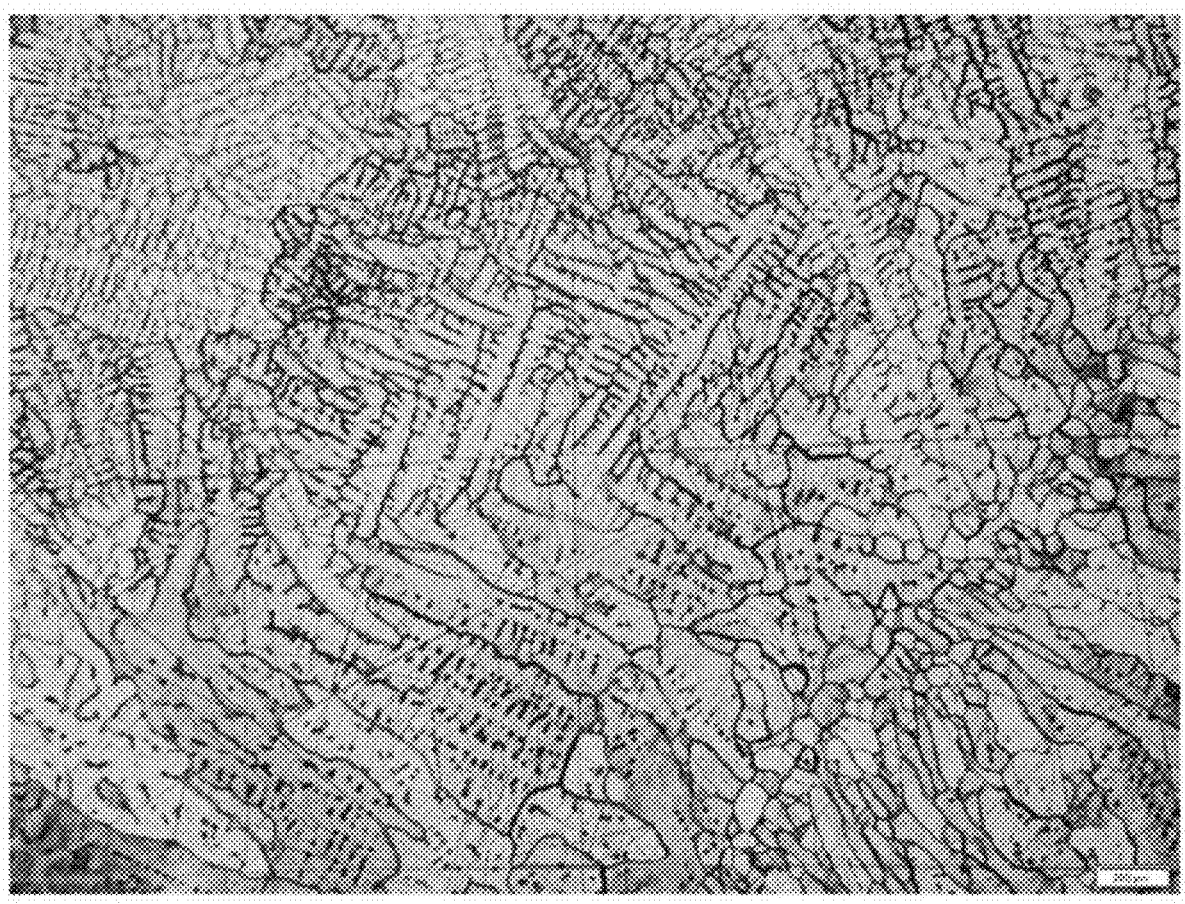
FIG. 17 provides an optical microscope image of as-cast $V_{95}Al_5$ alloy with $B_{0.1}Ti_{0.5}$ (wt %) grain refiner in the columnar region perpendicular to the direction of grain growth.
Figure 18:
FIG. 18 provides an optical microscope image of as-cast $V_{95}A1_5$ alloy with $B_{0.1}Ti_{0.5}$ (wt %) grain refiner in the equiaxed region.

| Composition | Conditions | Mean intercept length (micrometres) | Grain intercept (columnar grain region) | Grain intercept (equiaxed grain region) |
|---|---|---|---|---|
| $V_{95}Al_5$ (at %) | As-cast | 1069 (FIG. 16) | | |
| $V_{95}Al_5$ (at %) | As-cast with added $B_{0.1}Ti_{0.7}$ (wt %) | | 173 (FIG. 17) | 171 (FIG. 18) |

The $V_{95}Al_5$ alloy has a mean linear intercept of 1069 micrometres. After addition of B0.1Ti0.7 (wt %) the alloy had a mean intercept length of 171 micrometres in the region with equiaxed grains and 173 micrometres in the region with columnar grains (perpendicular to the direction of grain growth).

Process of Manufacturing Alloy Membrane Tube

Tube manufacture using the alloy of the present invention requires further refinement of the microstructure of the cast alloy. Casting and other forming processes produce an alloy having compositional homogeneity but microstructural inhomogeneity including porosity. Mechanical failure of alloys during tube production is normally related to the presence of porosity, and to low elongation as a result of poor microstructures (for example non-uniform distribution of grain sizes). Thus, it is desirable that the microstructure of the alloy is created with small grain size and narrow size distribution and having minimal (or minimised) porosity. This microstructure enhances the formability of the alloy, including increasing the ductility of the alloy.

Tube production is a multi-step process, first involving the production of rods with the desired composition, microstructure and dimensions, followed by deformation of these rods into the desired final shape.

Refinement of the grain size and greater microstructural homogeneity is achieved using the following general process steps:

forming a vanadium alloy having the general solid state solution formula of $V_{100-(Y+Z)}Al_YX_Z$ wherein X=Ti, Cr, Fe, Ni, B; Y is >0 to 10; and Z is >0 to 5; and heat treating the formed vanadium alloy at temperatures of from 800 to 1500° C. and pressures from 50 to 500 MPa.

The refined vanadium alloy is then formed into a tube using a tube deformation process, such as rolling, drawing, extrusion or the like as described below.

Ingot Preparation

Figure 19:
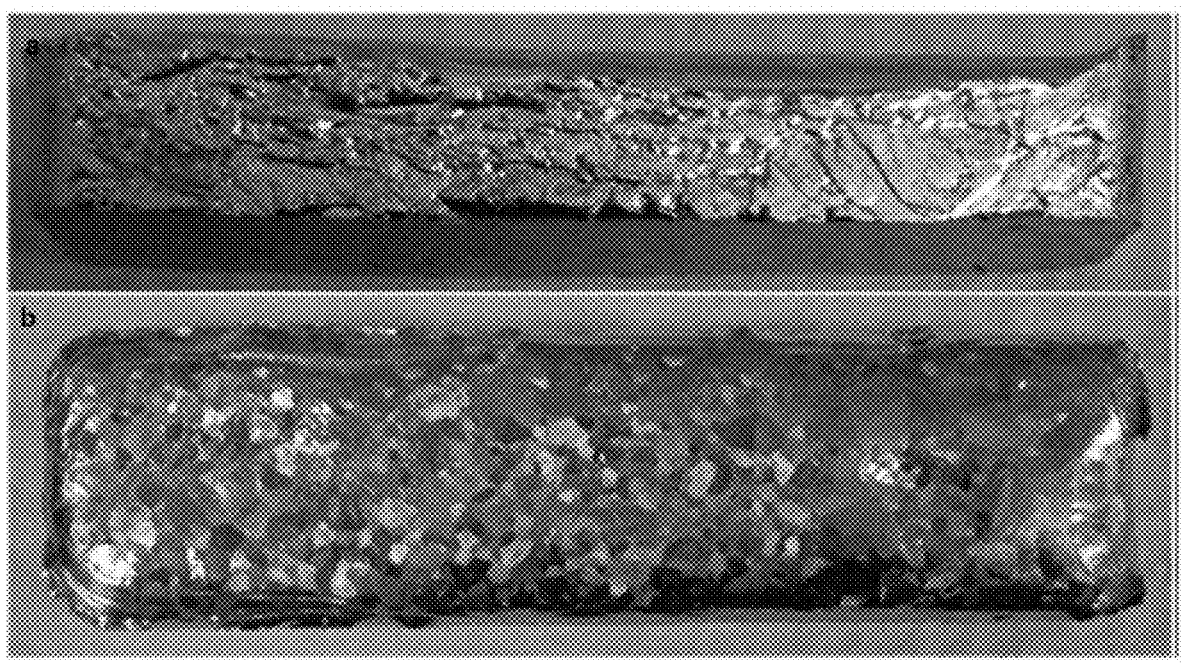
FIG. 19 is a photograph of alloy ingots prepared by "layer-by-layer" process, in which (a) is a side view; and (b) is a top view of the ingot.

The first step is the production of a bulk alloy product such as an ingot using a suitable casting process. For lab scale processes, a 25 mm×25 mm×100 mm ingot 200 was produced using as layer-by-layer arc melting. An example of one test ingot formed by this method is shown in FIG. 19. It should be appreciated that a similarly suitable ingot could be produced by cold-crucible induction melting. This produces an ingot containing porosity and large, inconsistent grain structure.

Alloy Homogenisation

The next step is to improve elongation of the alloy by minimising porosity in the cast ingots and optimise microstructures preparation for downstream tube manufacturing. This is achieved using a Hot Isostatic Pressing (HIP), which involves the simultaneous application of high temperature and pressure for a specified amount of time, was therefore employed to impart the desired properties to the arc-melted alloy bars.

The operational parameters for experimental HIP runs for V—Al alloys were as the follow:

Temperature 1200° C.;
Pressure 200 MPa;
Duration 2 hr;
Heating/cooling rate 5 k/min; and
Argon protective atmosphere.

Figure 20:
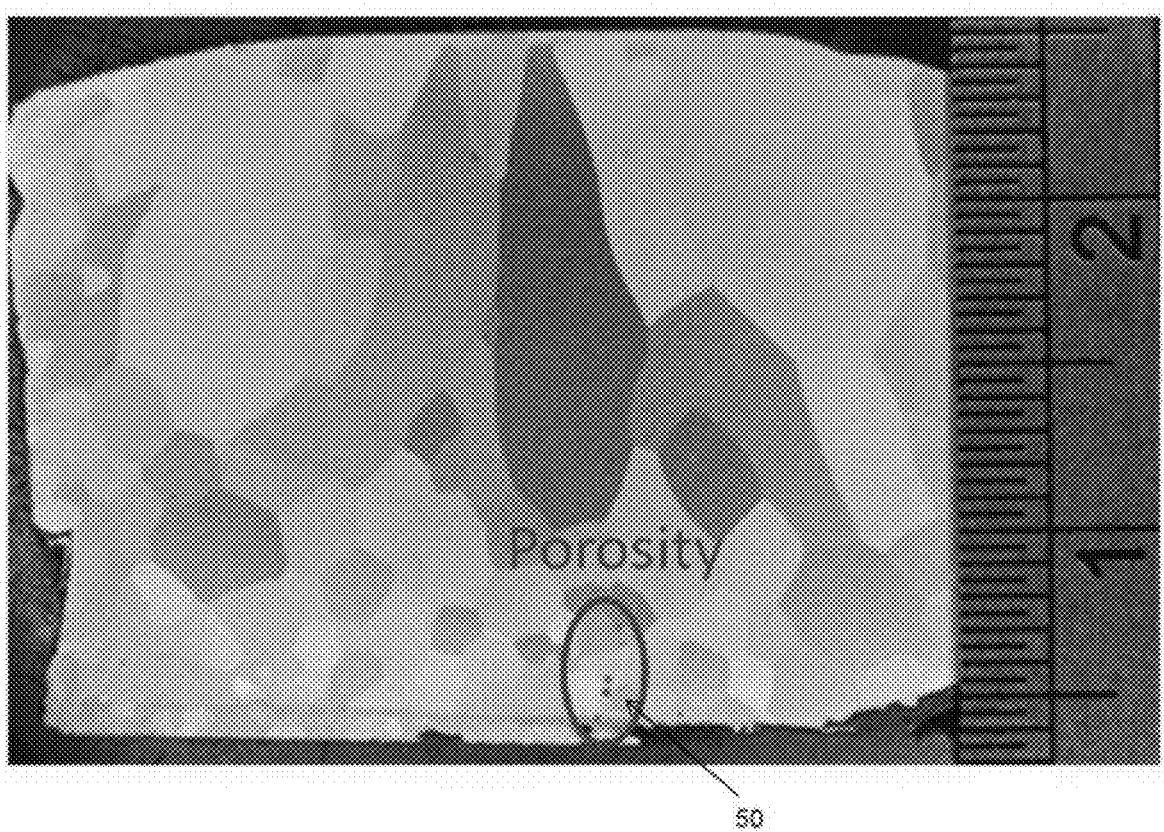
FIG. 20 provides an optical micrograph of V—Al alloy before HIP treatment.
Figure 21:
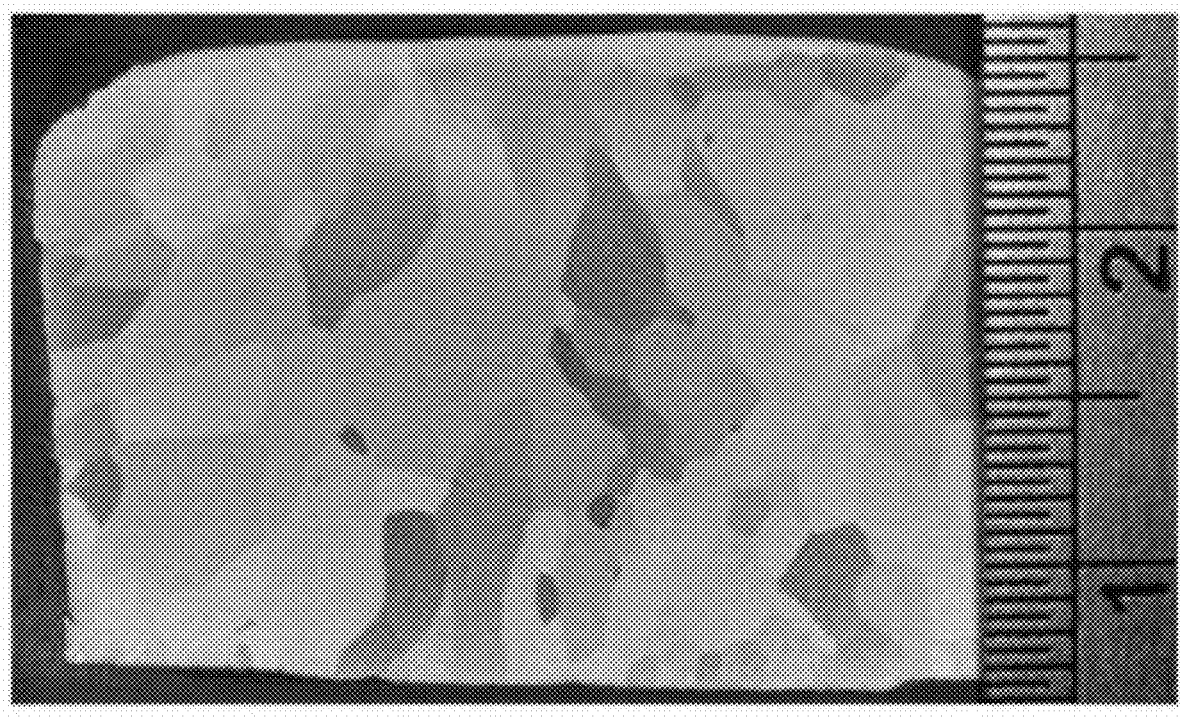
FIG. 21 provides an optical micrograph of V—Al alloy after HIP treatment.

As best shown in FIGS. 20 and 21, the HIP-ed samples indeed show that porosity is reduced and grain size distribution become more uniform. FIG. 20 provides an optical micrograph of V—Al alloy before HIP treatment showing some porosity 50. FIG. 21 provides an optical micrograph of V—Al alloy after HIP treatment. No appreciable porosity was detected. Furthermore, the grain size underwent refinement resulting in smaller grain size compared to the as cast alloy.

Before HIP treatment, the cast $V_{95}Al_5$ alloy, with a thickness of 20 mm, had a grain linear intercept of 15 mm parallel to the columnar growth direction and 3.6 mm perpendicular to the growth direction (as determined using method ASTM E112-113), and the presence of voids greater than 0.3 mm.

After HIP treatment, the same $V_{95}Al_5$ alloy had a grain linear intercept of 3.0 mm parallel to growth direction and 2.7 mm perpendicular to growth direction (as determined using method ASTM E112-113), and an absence of voids greater than 0.3 mm.

The decrease the grain linear intercept value from the HIP treatment is expected to result in an increase in ductility of at least 1%, preferably at least 2%, more preferably at least 3%, yet even more preferably at least 4% and most preferably at least 5%. Thus, the ductility of V—Al alloys of the present invention are preferably at least 10%, more preferably at least 12% and even more preferably at least 15%.

It was found that the HIP process also resulted in a more equiaxed grain shape which inherently results in higher strength and ductility due to more planes on which to slip. For the purposes of the present invention, an equiaxed grain shape has a ratio of the grain linear intercept of the growth direction to perpendicular to the growth direction of between 0.5 to 1.5 and 1.5 to 0.5 and more preferably between 0.8 to 1.2 and 1.2 to 0.8.

Tubular Membrane

The vanadium alloy of the present invention is particularly suitable for use as a catalytic alloy membrane of a catalytic membrane reactor (CMR). As described above, the composition and resulting properties of the alloy have been optimised for use in forming a tubular membrane for a CMR.

Figure 22:
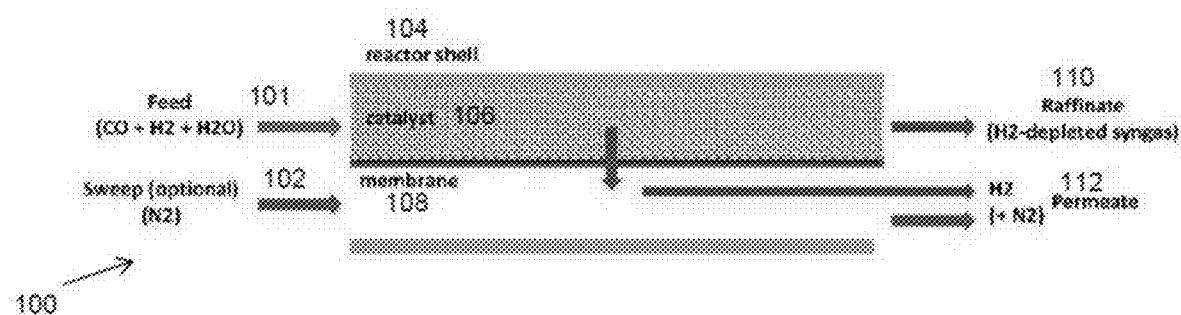
FIG. 22 illustrates a schematic of catalytic membrane reactor.

A typical CMR 100 is shown in FIG. 22 illustrating the close coupling of the water-gas shift conversion catalyst 106 and $H_2$-selective membrane 108. The illustrated CMR 100 schematic shows a plate membrane with a $CO+H_2+H_2O$ feed 101, feed into the reactor shell 104, between which sits the catalyst 106 and membrane 108. The feed 101 undergoes that water-gas-shift (WGS) in the catalyst 106 to produce a raffinate 110 ($H_2$-depleted syngas) and $H_2$ permeate 112. An option nitrogen sweep 102 can also be used for $H_2$ exiting the membrane. Being exothermic, the WGS reaction is favoured at lower temperatures, but reaction kinetics is favoured at high temperatures. To overcome this limitation, commercial WGS processes include a high temperature stage (~450° C., for fast kinetics, which reduces the required reactor size) and a low temperature stage (~200° C., to maximize conversion of residual CO from the high-temperature stage). A CMR allows the low-temperature reactor to be eliminated by allowing high WGS conversion at high temperature. Applied to the processing of coal-derived syngas, a CMR can achieve near-complete CO to $H_2$ conversion, $H_2$ purification and pre-combustion $CO_2$ capture in a single device.

Figure 23:
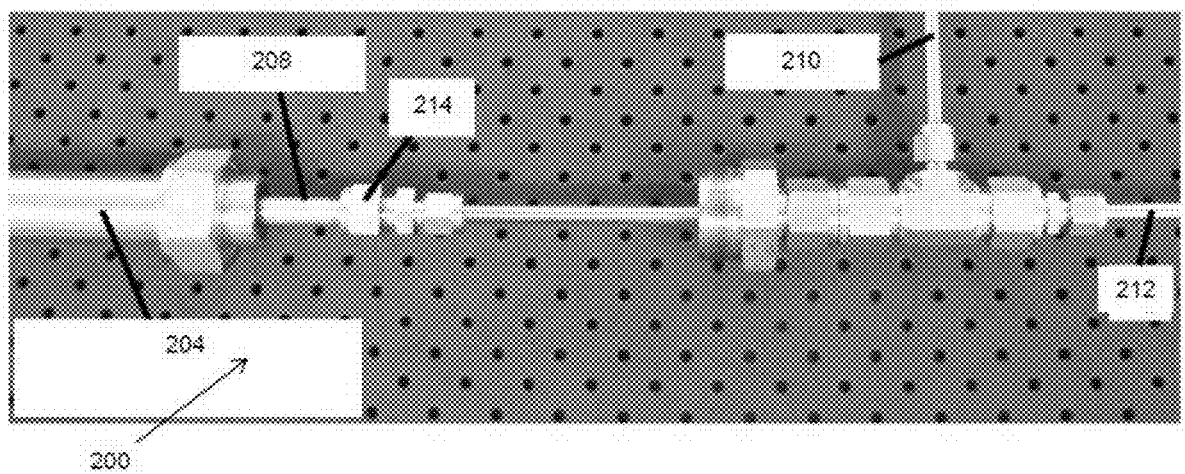
FIG. 23 provides a photograph of a prototype tubular CMR.

A prototype tubular CMR 200 which can include a tubular membrane formed from the vanadium alloy of the present invention is shown in FIG. 23. The tubular CMR 200 incorporates a tubular membrane 208 within a tubular shell 204, with the catalyst occupying the annular space within the shell 204. The greatest advantage of this configuration is the reduced seal area, with seals (for example 214) required only at each end of the tube. Again, the CMR 200 produces a raffinate 210 ($H_2$-depleted syngas) and $H_2$ permeate 212. The tubular CMR also allows for greater use of readily available tubing and compression fittings, making for simple and reliable assembly.

Tubular Membrane Fabrication

The tubular configuration offers a significant advantage over the planar configuration in terms of a greatly reduced sealing area, and simpler construction. Vanadium-based alloy membranes, when compared to palladium alloy membranes, offer a further advantage in manufacturing. Pd-based membranes must be very thin to minimise cost and maximise hydrogen permeance. This necessities the use of a porous support structure. The higher permeance of V-based alloys allows for thicker membranes which can be self-supporting. This greatly reduces the complexity and cost of the manufacturing process.

The desired alloy tubing is intended to have the following dimensions:
diameter (2 to 25 mm); and
wall thickness (0.05 to 1.00 mm).

Tubular membrane fabrication uses tensile deformation, which entrails material shape dimension and materials property requirements for the tensile deformation process:

The pre-form materials for the deformation process have to be cast or sintered in sufficient size, for example, a cylinder shape of 25 to 50 mm diameter and 100 to 300 mm height. This presents a significant challenge for V based alloys, which have high meting temperatures (up to 2000° C.), requiring very high meting power, and leads to a tendency to react with refractory containment materials; and The feed materials should have sufficient ductility. It is considered that the materials with elongation below 10% are likely not suitable for the deformation processes aiming to produce small tubular membranes.

If the above properties are met, the standard production route for manufacturing small size tubular components can be used, which include rod casting, extrusion, and drawing.

Proposed Manufacturing Route for V—Al (V-1) Alloys

Based on the properties investigated, the V—Al alloy (and in particular $V_{95}Al_5$) has the highest elongation for all the V based alloys investigated so far, and is therefore the best candidate for manufacturing as a tubular membrane by the preferred tensile deformation route.

One fabrication route for V—Al tubes is as follows:
1). Produce preform alloy rods of 25 to 50 mm diameter and 50 to 300 mm length by casting or solid state sintering methods;
2). Anneal the alloy rods to maximise ductility;
3). Extrude rods into rough tubes;
4). Draw the rough tubes with multiple machines to fabricate tubular membrane of ⅜" diameter and ≤0.2 mm wall thickness with intermediate annealing;
5). Strengthening heat treatment; and
6). Cut tubes to the desired length.

The targeted dimensions of membrane tubes produced by this method are:
Length: ≥1000 mm;
Outer diameter: 2 to 25 mm, preferably 9.52 mm (⅜"); and
Wall thickness: 0.05 to 1.00 mm, preferably ≤0.200 mm.

Catalytic Surface

Alloy membranes operate via a solution-diffusion mechanism, whereby:
molecular $H_2$ adsorbs on the high-pressure surface and is split into atomic hydrogen;
the atomic H dissolves into the metal and migrates by jumping between interstitial sites in the metal lattice, driven by a concentration gradient; and
the atomic hydrogen recombines to $H_2$ on the low-pressure surface and desorbs.

Vanadium forms a tightly-held oxide layer which is poorly catalytic and acts as a barrier to hydrogen dissolution. A catalytic surface is preferably applied to the alloy membrane to achieve a sufficient reaction rate of splitting of the hydrogen molecule must at the membrane feed surface.

To function as a membrane, the oxide must be removed and a thin layer of Pd, the best-known $H_2$ dissociation catalyst, must be applied. As can be understood in the art, the application of a Pd layer requires the oxide to be removed using a series of mechanical and chemical cleaning steps prior to deposition of Pd onto that surface using electroplating or electroless plating. Various suitable processes for those steps are known in the art.

Figure 24:
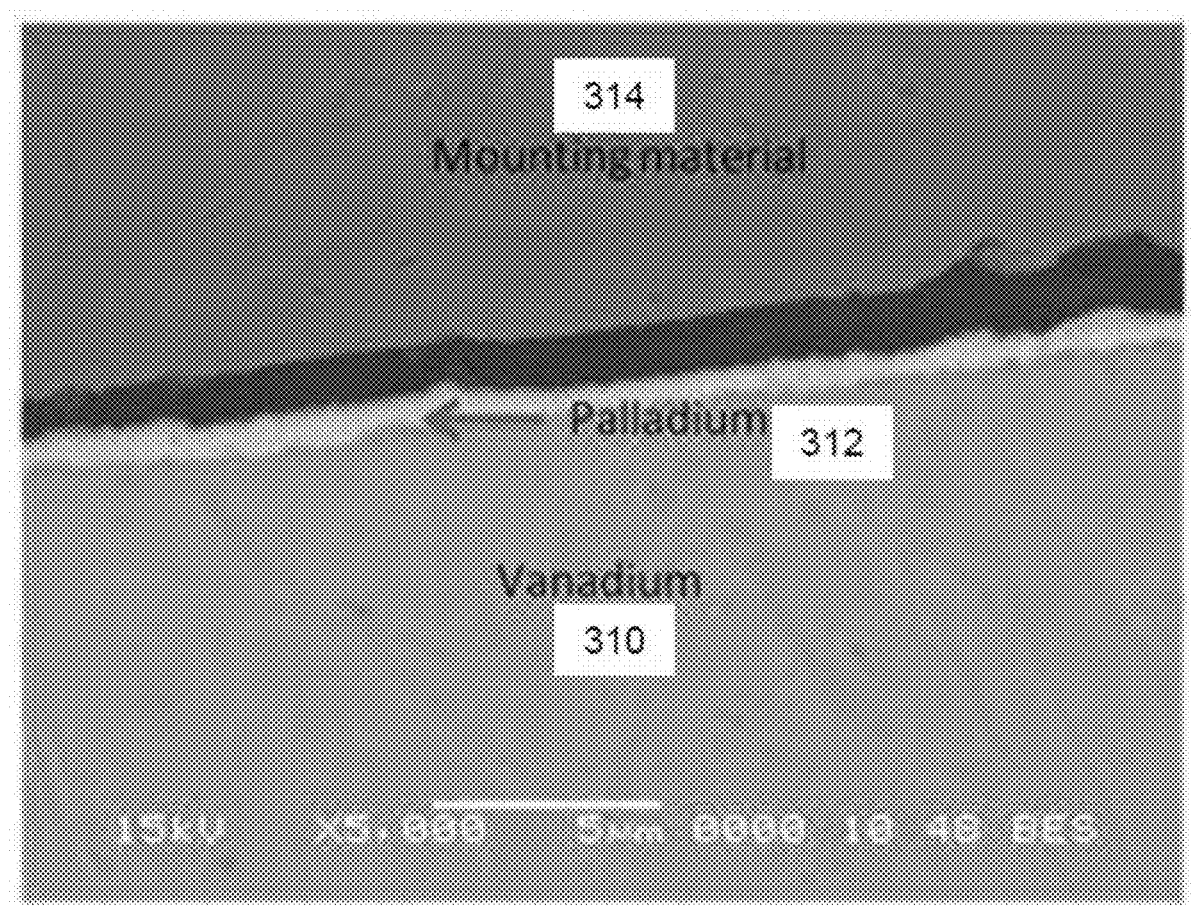
FIG. 24 provides a photograph of the interface between vanadium alloy tube and electroplated Pd catalyst layer.

FIG. 24 shows an electron micrograph of the V—Pd interface showing a layered structure of vanadium 310, palladium coating 312, and epoxy resin mounting material 314. The optimal Pd layer thickness is between 200 and 500 nm. This Pd layer thickness offers a good compromise between durability and cost.

Once the Pd layer is applied to the internal surface of a selected tube, the membrane tube can be used as a $H_2$-selective membrane in a catalytic membrane reactor (CMR).

Reactor Operation

As previously noted, the composition of the alloy of the present invention is selected to avoid this phase transition during operation. In this respect, the transition temperatures in a V—Al alloy are advantageous, as shown in a V—Al phase diagram, which can be exploited to avoid this phase transition. In comparison, the transition temperatures in V—Ni and V—Cr alloys, do not allow these alloys to avoid phase transition in the required operating range (between 0 and 500° C. and H/M ratios of greater than 0.05). In fact, use of V, V—Ni and V—Cr alloys increase brittle failure when cooled from an operating temperature of around 400° C. to room temperature in H/M ratios of greater than 0.05. This can be seen for example when comparing the operating temperatures and H/M ratios necessary to avoid α to β phase change for V and $V_{90}Al_{10}$ shown in FIG. 20. For shut down, V and other V alloys typically require hydrogen to be flushed out and desorbed from the metal prior to shutdown to reduce the H/M ratio to around 0 before the temperature can be reduced in the reactor. This therefore requires a two-step procedure during shut down. As the α to β phase change can be avoided in normal operating conditions, this hydrogen flushing step can be avoided using the alloy of the present invention.

Figure 25:
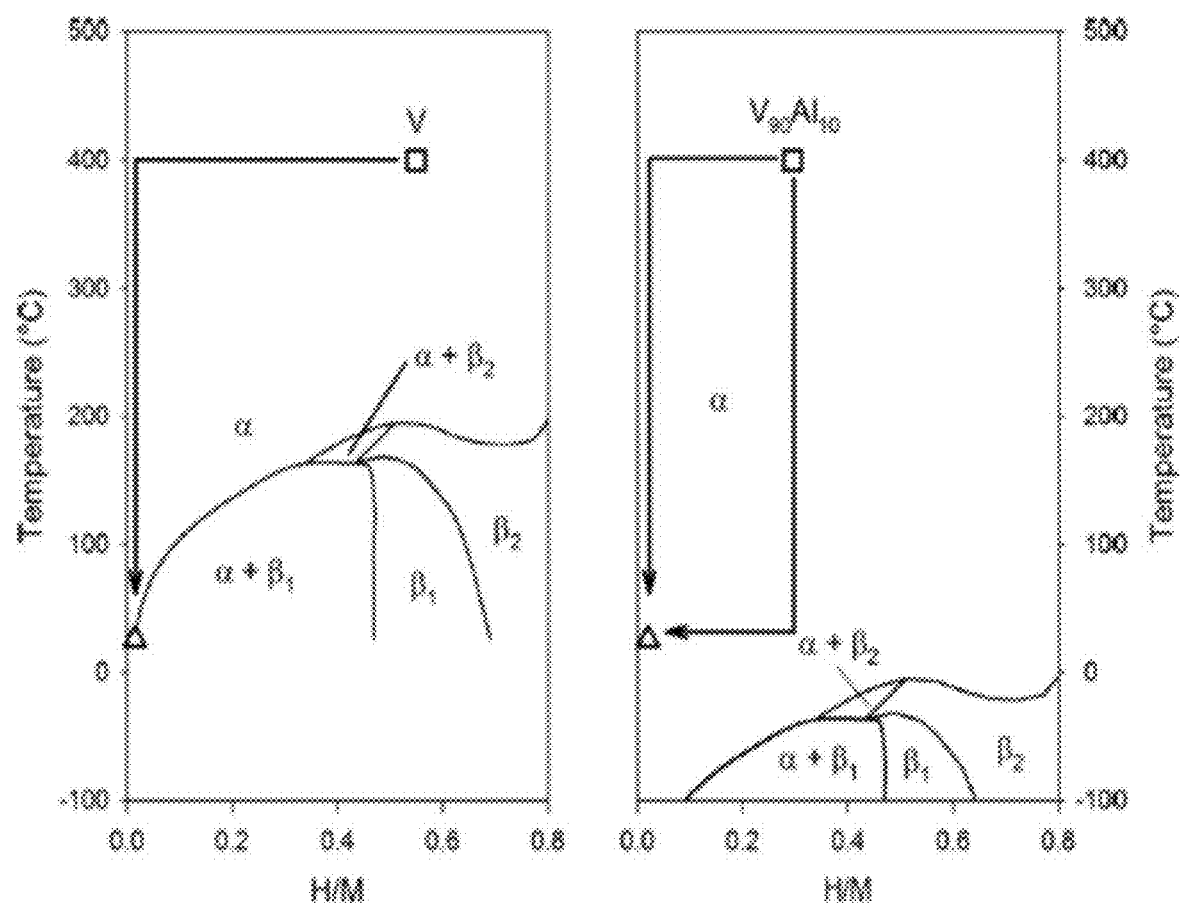
FIG. 25 provides a comparison of the operating temperatures and H/M ratios necessary to avoid α to β phase change for V and $V_{90}Al_{10}$.

Use of an alloy membrane formed of the vanadium alloy of the present invention therefore provides the advantage of enabling a CMR to be operated in conditions which were previously not possible for V and other V alloys. In particular, an alloy membrane formed of the vanadium alloy of the present invention can operate in hydrogen to metal (H/M) ratio of greater than 0.05 and a temperature between 0 to 350° C. (see FIG. 25).

This is particularly advantageous during a number of operating conditions of the reactor including start-up and shutdown of the reactor, as no special temperature or H/R considerations need be taken when undertaking start-up and shutdown procedures in the above operating conditions. Accordingly, this enables the reactor to be started up room temperature, say 20 to 30° C. to an operating temperature of around for example 200 to 400° C. to without the membrane undergoing phase transition. Similarly, this enables the reactor to be shut down from an operating temperature of for example 200 to 400° C. to room temperature, say 20 to 30° C. without the membrane undergoing phase transition.

A membrane can therefore be cycled between operating and ambient temperature without going through phase transition, allowing simplistic shut down of reactor.

This allows the membrane to be used through multiple cycles of operation. The likelihood of brittle failure during shutdown is greatly reduced.

Applications

The primary application is in high-temperature, hydrogen-selective alloy membranes. These devices separate hydrogen from mixed gas streams which can also contain $H_2O$, $CO$, $CO_2$, $CH_4$ and $H_2S$. One particular application is use of hydrogen-selective alloy membranes for the production of $H_2$ and capture of $CO_2$ from gasified coal and biomass.

Other possible applications include a medium for storing high purity hydrogen gas for use in fuel cells for mobile or distributed electricity generation, the shielding of ionising radiation for aerospace applications, and as a thermal energy storage medium.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A process of producing a tube comprising a heat treated vanadium alloy, the process comprising:
    forming a vanadium alloy consisting of:
        aluminium having a content of greater than 0 to 10 at %; optionally a grain refining element selected from Ti, Cr, Fe, Ni or B having a content of greater than 0 to 5 at %, and the balance vanadium and unavoidable impurities;
    heat treating the formed vanadium alloy at temperatures of from 800 to 1500° C. and pressures from 50 to 500 MPa, thereby producing a heat treated vanadium alloy having a ductility of greater than 10% elongation; and
    subjecting the heat treated vanadium alloy to a deformation process so as to form the tube comprising the heat treated vanadium alloy and having a wall thickness of 0.05 to 1 mm.

2. The process of producing a tube comprising a heat treated vanadium alloy according to claim 1, wherein said heat treated vanadium alloy has a ductility greater or equal to 12% elongation.

3. The process of producing a tube comprising a heat treated vanadium alloy according to claim 1, wherein the heat treatment step comprises a Hot Isostatic Pressing (HIP) process.

4. The process of producing a tube comprising a heat treated vanadium alloy according to claim 1, wherein the heat treatment step comprises subjecting the vanadium alloy to temperatures of from 1000 to 1400° C.

5. The process of producing a tube comprising a heat treated vanadium alloy according to claim 4, wherein the heat treatment step comprises subjecting the vanadium alloy to pressures from 50 to 400 MPa.

6. The process of producing a tube comprising a heat treated vanadium alloy according to claim 4, wherein the heat treatment step is undertaken for a duration of at least 30 min.

7. The process of producing a tube comprising a heat treated vanadium alloy according to claim 4, wherein at least one of a heating rate or cooling rate of the heat treatment step is at least 4 K/min.

8. A process according to claim 1, wherein the tube has an outer diameter of between 2 to 25 mm.

9. The process of producing a tube comprising a heat treated vanadium alloy according to claim 1, wherein said heat treated vanadium alloy has a grain linear intercept of less than 5.0 mm, based upon a minimum sample size of 6 grains.

10. The process of producing a tube comprising a heat treated vanadium alloy according to claim 1, wherein said heat treated vanadium alloy does not include any voids having an average size of greater than 0.5 mm.

11. A process of producing a tube comprising a heat treated vanadium alloy, the process comprising:
    forming a vanadium alloy consisting of:
        aluminium having a content of greater than 0 to 10 at %; a grain refining element selected from Ti, Cr, Fe, Ni or B having a content of 0 to 5 at %, and the balance vanadium and unavoidable impurities;
    heat treating the formed vanadium alloy at temperatures of from 800 to 1500° C. and pressures from 50 to 500 MPa, thereby producing a heat treated vanadium alloy having a ductility of greater than 10% elongation; and
    subjecting the heat treated vanadium alloy to a deformation process so as to form the tube comprising the heat treated vanadium alloy and having a wall thickness of 0.05 to 1 mm.

12. The process of producing a tube comprising a heat treated vanadium alloy according to claim 11, wherein said heat treated vanadium alloy has a ductility greater or equal to 12% elongation.

13. The process of producing a tube comprising a heat treated vanadium alloy according to claim 11, wherein the heat treatment step comprises a Hot Isostatic Pressing (HIP) process.

14. The process of producing a tube comprising a heat treated vanadium alloy according to claim 11, wherein the heat treatment step comprises subjecting the vanadium alloy to temperatures of from 1000 to 1400° C.

15. The process of producing a tube comprising a heat treated vanadium alloy according to claim 14, wherein the heat treatment step comprises subjecting the vanadium alloy to pressures from 50 to 400 MPa.

16. The process of producing a tube comprising a heat treated vanadium alloy according to claim 14, wherein the heat treatment step is undertaken for a duration of at least 30 min.

17. The process of producing a tube comprising a heat treated vanadium alloy according to claim 14, wherein at least one of a heating rate or cooling rate of the heat treatment step is at least 4 K/min.

18. A process according to claim 11, wherein the tube has an outer diameter of between 2 to 25 mm.

19. The process of producing a tube comprising a heat treated vanadium alloy according to claim 11, wherein said heat treated vanadium alloy has a grain linear intercept of less than 5.0 mm, based upon a minimum sample size of 6 grains.

20. The process of producing a tube comprising a heat treated vanadium alloy according to claim 11, wherein said heat treated vanadium alloy does not include any voids having an average size of greater than 0.5 mm.

* * * * *